US010913807B2

(12) United States Patent
Yurt et al.

(10) Patent No.: US 10,913,807 B2
(45) Date of Patent: Feb. 9, 2021

(54) POLYMERIC COMPOSITIONS PREPARED WITH A CONTROLLED RADICAL INITIATOR

(71) Applicant: 3M INNOVATIVE PROPERTIES COMPANY, St. Paul, MN (US)

(72) Inventors: Serkan Yurt, St. Paul, MN (US); Stephen B. Roscoe, Woodbury, MN (US); George W. Griesgraber, Eagan, MN (US); Babu N. Gaddam, Woodbury, MN (US); Kevin M. Lewandowski, Inver Grove Heights, MN (US); Bryan T. Whiting, St. Paul, MN (US); Haeen Sykora, Hudson, WI (US); Aaron T. Hedegaard, Woodbury, MN (US); Jayshree Seth, Woodbury, MN (US); Janet A. Venne, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/733,259

(22) PCT Filed: Dec. 14, 2018

(86) PCT No.: PCT/IB2018/060129
§ 371 (c)(1),
(2) Date: Jun. 18, 2020

(87) PCT Pub. No.: WO2019/123182
PCT Pub. Date: Jun. 27, 2019

(65) Prior Publication Data
US 2020/0308321 A1    Oct. 1, 2020

Related U.S. Application Data

(60) Provisional application No. 62/608,880, filed on Dec. 21, 2017.

(51) Int. Cl.
| *C08F 20/38* | (2006.01) |
| *C09J 7/38* | (2018.01) |
| *C08F 2/50* | (2006.01) |
| *C08F 293/00* | (2006.01) |
| *C08K 3/36* | (2006.01) |
| *C08K 5/3492* | (2006.01) |
| *C08K 5/5419* | (2006.01) |
| *C08J 7/04* | (2020.01) |

(52) U.S. Cl.
CPC ............... *C08F 20/38* (2013.01); *C08F 2/50* (2013.01); *C08F 293/005* (2013.01); *C08K 3/36* (2013.01); *C08K 5/3492* (2013.01); *C08K 5/5419* (2013.01); *C09J 7/385* (2018.01); *C08J 7/0427* (2020.01); *C08J 2333/14* (2013.01)

(58) Field of Classification Search
CPC ........ C08F 20/36; C08F 2/50; C08F 293/005; C09J 7/385; C09J 7/0427; C09J 2333/14; C08K 3/36; C08K 5/3492; C08K 5/5419
USPC .......................................................... 525/7.1
See application file for complete search history.

(56) References Cited

U.S. PATENT DOCUMENTS

| 2,716,633 | A |  | 8/1955 | Engelhardt |  |
| 4,181,752 | A |  | 1/1980 | Martens |  |
| 4,329,384 | A | * | 5/1982 | Vesley | ............ C08F 2/46 428/41.3 |
| 4,330,590 | A |  | 5/1982 | Vesley |  |
| 4,379,201 | A |  | 4/1983 | Heilmann |  |
| 5,506,279 | A |  | 4/1996 | Babu |  |
| 5,773,485 | A |  | 6/1998 | Bennett |  |
| 5,773,836 | A |  | 6/1998 | Hartley |  |
| 6,214,460 | B1 |  | 4/2001 | Bluem |  |
| 6,416,838 | B1 |  | 7/2002 | Arney |  |
| 9,616,394 | B2 |  | 4/2017 | Bothof |  |
| 2004/0106732 | A1 | * | 6/2004 | Tsuji | ............ C08L 53/00 525/94 |
| 2017/0165617 | A1 |  | 6/2017 | Bothof |  |

FOREIGN PATENT DOCUMENTS

| EP | 0286376 | 10/1988 |  |
| EP | 0349270 | 1/1990 |  |
| WO | 1981-02261 | 8/1981 |  |
| WO | 1993-20164 | 10/1993 |  |
| WO | WO-9320164 A1 * | 10/1993 | ............ C08F 287/00 |
| WO | 2014-093014 | 6/2014 |  |
| WO | 2015-077114 | 5/2015 |  |
| WO | 2016-178871 | 11/2016 |  |
| WO | 2018-013330 | 1/2018 |  |
| WO | 2018-118905 | 6/2018 |  |

OTHER PUBLICATIONS

O'Reilly et al. "Mild and Facile Synthesis of Miiiti-Fiinctionai RAFT Chain Transfer Agents", Polymers 2009, 1, 3-15, doi 10 3390/polym 1010003. (Year: 2009).*
Cogswell, "Converging Flow of Polymer Melts in Extrusion Dies", Polymer Engineering and Science, Jan. 1972, vol. 12, pp. 64-73.
Destarac, Madix Technology: From Innovative Concepts to Industrialization, Polymer Preprints, (American Chemical Society, Division of Polymer Chemistry), 2008, vol. 49, No. 2, pp. 179.

(Continued)

*Primary Examiner* — Michael Bernshteyn
(74) *Attorney, Agent, or Firm* — Jean A. Lown

(57) ABSTRACT

Crosslinkable polymeric materials, crosslinked polymeric materials, articles containing the crosslinkable polymeric materials or crosslinked polymeric materials, and methods of making the articles and various compositions are provided. More particularly, the crosslinkable composition contains a) a first polymeric material, which has terminal dithiocarbamate or dithiocarbonate groups, b) a crosslinking composition containing a chlorinated triazine crosslinking agent and/or a crosslinking monomer having two or more ethylenically unsaturated groups, and c) a thixotropic agent containing metal oxide particles. The crosslinkable composition may be printable or dispensed. In some embodiments, the crosslinked composition is a pressure-sensitive adhesive.

17 Claims, No Drawings

(56) References Cited

OTHER PUBLICATIONS

Mattioni, "Prediction of Glass Transition Temperatures from Monomer and Repeat Unit Structure Using Computational Neural Networks", The Journal of Chemical Information and Computer Scientists, 2002, vol. 42, pp. 232-240.
O'Reilly, "Mild and Facile Synthesis of Multifunctional RAFT Chain Transfer of Agents", Polymers, 2009, vol. 1, pp. 3-15, XP055405326.
Otsu, "Role of Initiator-Transfer Agent-Terminator (Iniferter) in Radical Polymerizations: Polymer Design by Organic Disulfides as Iniferters", Makromol. Chem., Rapid Commun.,1982, vol. 3, pp. 127-132.
Taton, "Macromolecular Design by Interchange of Xanthates: Background, Design, Scope and Applications", Handbook of RAFT Polymerization, Edited by Barner-Kowollik, Wiley-VCH: Weinheim, 2008, pp. 373.
Tsarevsky, "Controlled Radical Polymerization: Mechanisms", ACS Symposium Series, American Chemical Society, Washington, DC, 2015, pp. 211-246.
Wakabayashi, "Studies on s-Triazines I. Cotrimerization of Trichloroacetonitrile with other Nitriles", Bulletin of the Chemical Society of Japan, 1969, vol. 42, pp. 2924-2930.
International Search Report for PCT International Application No. PCT/IB2018/060129, dated Apr. 4, 2019, 5 pages.

* cited by examiner

POLYMERIC COMPOSITIONS PREPARED WITH A CONTROLLED RADICAL INITIATOR

CROSS REFERENCE TO RELATED APPLICATIONS

This application is a national stage filing under 35 U.S.C. 371 of PCT/IB2018/060129, filed Dec. 14, 2018, which claims the benefit of U.S. Provisional Patent Application No. 62/608,880, filed Dec. 21, 2017, the disclosure of which is incorporated by reference herein in its entirety.

BACKGROUND

Controlled radical polymerization methods have been developed that allow the preparation of polymers with well-defined molecular weight, polydispersity, topology, composition, and microstructure. These methods are based on the use of special polymerization mediators, which temporarily and reversibly transform propagating radicals into dormant and/or stable species. These reversible transformations are typically either accomplished by reversible deactivation or by reversible chain transfer. Some of the methods that involve controlled radical polymerization through reversible transformations include iniferter methods, nitroxide mediated polymerization (NMP) methods, atom transfer polymerization (ATRP) methods, and reversible addition-fragmentation (RAFT) methods.

The terms "iniferter" and "photoiniferters" refer to molecules that can act as an initiator, chain transfer agent, and terminator. Various iniferters were discussed in Otsu et al., *Makromol. Chem., Rapid Commun.*, 3, 127-132 (1982). The compound p-xylene bis(N,N-diethyldithiocarbamate) (XDC) has been used to form various acrylic-based block copolymers such as those described in European Patent Applications 0286376 A2 (Otsu et al.) and 0349270 A2 (Mahfuza et al.). Xanthate esters were used as a photoinitiator in U.S. Pat. No. 2,716,633 (Vaughn et al.).

Some polymeric materials have been formed by applying a layer of a crosslinkable composition to the surface of a substrate. The crosslinkable composition can contain a prepolymer (e.g., a syrup polymer) plus additional monomers and a crosslinking agent. Crosslinked compositions can be prepared by exposing the crosslinkable composition to actinic radiation such as ultraviolet radiation. Such polymeric materials and processes are described in U.S. Pat. No. 4,181,752 (Martens et al.), U.S. Pat. No. 4,330,590 (Vesley), U.S. Pat. No. 4,329,384 (Vesley et al.), U.S. Pat. No. 4,379,201 (Heilmann et al.), U.S. Pat. No. 5,506,279 (Babu et al.), U.S. Pat. No. 5,773,836 (Bennett et al.), and U.S. Pat. No. 5,773,485 (Bennett et al.).

Various printable or dispensable adhesive compositions have been described in U.S. Pat. No. 6,214,460 (Bluem et al.) and PCT application publications WO 2016/178871 (Campbell et al.), WO 2015/077114 (Clapper et al.), and WO 2014/093014 (Yurt et al.).

SUMMARY

A crosslinkable composition, a crosslinked composition, articles containing the crosslinked composition or the crosslinked composition, and methods of making the various compositions and articles are provided. The crosslinkable composition includes a polymeric material that is formed using a photoinitiator with two thiocarbonylthio-containing groups. The crosslinkable compositions can be used for printing or dispensing onto a substrate. In many embodiments, the crosslinked compositions are pressure-sensitive adhesives.

The crosslinkable compositions contain a) a polymeric material having at least two terminal thiocarbonylthio-containing groups (i.e., dithiocarbamate or dithiocarbonate groups), b) a crosslinking composition, and c) a thixotropic agent that includes a metal oxide particle. The polymeric material included in the crosslinkable compositions is formed using a photoinitiator with two terminal thiocarbonylthio-containing groups and a single carbon atom between the two thiocarbonylthio-containing groups. The photoinitiator allows for controlled growth of the polymeric material to the desired weight average molecular weight. Control of the molecular weight of the polymeric material allows the crosslinkable compositions to be used in printing or dispensing applications.

In a first aspect, a crosslinkable composition is provided. The crosslinkable composition includes a) a first polymeric material of Formula (II),

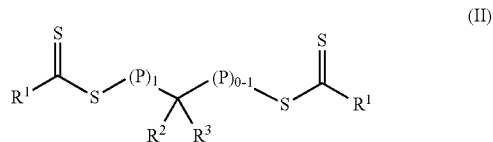

b) a crosslinking composition, and c) a thixotropic agent containing a metal oxide particle. In the first polymeric material of Formula (II), $(P)_1$ means that there is one polymeric group and $(P)_{0-1}$ means that there are 0 or 1 polymeric groups. Each polymeric group P comprises a polymerized product of a first monomer composition containing a first monomer having a single ethylenically unsaturated group. Each $R^1$ an alkoxy, aralkyloxy, alkenoxy, or $-N(R^4)_2$. Group $R^2$ is of formula $-(OR^5)_q-OR^6$ or of formula $-(CO)-X-R^7$. Group $R^3$ is hydrogen, alkyl, aryl, substituted aryl (i.e., an aryl substituted with at least one alkyl, alkoxy, or halo), alkaryl, a group of formula $-(CO)-OR^8$, or a group of formula $-(CO)-N(R^9)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group $R^{10}$ is hydrogen, alkyl, aryl, aralkyl, or alkaryl. Group X is a single bond, oxy, or $-NR^{10}-$. The crosslinking composition is miscible with the polymeric material of Formula (II) and contains a chlorinated triazine crosslinking agent and/or a crosslinking monomer having at least two ethylenically unsaturated groups.

In a second aspect, a crosslinked composition is provided. The crosslinked composition contains a polymerized product of the crosslinkable composition described above in the first aspect.

In a third aspect, a method of making a crosslinkable composition is provided. The method includes preparing a first reaction mixture that contains 1) a photoinitiator of Formula (I)

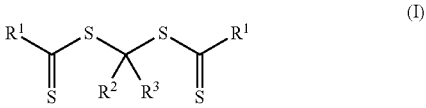

(I)

and 2) a first monomer composition comprising a first monomer having a single ethylenically unsaturated group. In Formula (I), each $R^1$ an alkoxy, aralkyloxy, alkenoxy, or $—N(R^4)_2$. Group $R^2$ is of formula $—(OR^5)_q—OR^6$ or of formula $—(CO)—X—R^7$. Group $R^3$ is hydrogen, alkyl, aryl, substituted aryl (i.e., an aryl substituted with at least one alkyl, alkoxy, or halo), alkaryl, a group of formula $—(CO)—OR^8$, or a group of formula $—(CO)—N(R^9)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group $R^{10}$ is hydrogen, alkyl, aryl, aralkyl, or alkaryl. Group X is a single bond, oxy, or $—NR^{10}—$. The method further includes exposing the first reaction mixture to actinic radiation to form a polymeric syrup containing a first polymeric material of Formula (II).

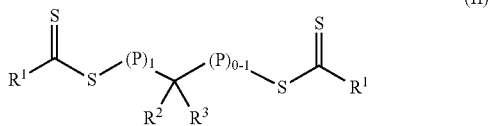

(II)

In the first polymeric material of Formula (II), $(P)_1$ means that there is one polymeric group and $(P)_{0-1}$ means that there are 0 or 1 polymeric groups. Each polymeric group P comprises a polymerized product of a first monomer composition containing a first monomer having a single ethylenically unsaturated group. The method further includes forming a crosslinkable composition containing 1) the first polymeric material of Formula (II), 2) a crosslinking composition containing a chlorinated triazine crosslinking agent and/or a crosslinking monomer having at least two ethylenically unsaturated groups, and 3) a thixotropic agent comprising a metal oxide particle.

In a fourth aspect, a method of making a crosslinked composition is provided. The method includes preparing a crosslinkable composition as described in the third aspect. The method still further includes exposing the crosslinkable composition to actinic radiation to form a crosslinked composition.

In a fifth aspect, a first article is provided that includes 1) a substrate and 2) a crosslinkable composition positioned adjacent to the substrate. The crosslinkable composition is the same as described in the first aspect above.

In a sixth aspect, a second article is provided that includes 1) a substrate and 2) a crosslinked composition positioned adjacent to the substrate. The crosslinked composition is the same as described in the second aspect above.

In a seventh aspect, a method of making a first article is provide. The method includes providing a substrate and applying a crosslinkable composition adjacent to the substrate to form the first article. The crosslinkable composition is the same as described in the first aspect above.

In an eighth aspect, a method of making a second article is provided. The method includes providing a substrate and applying a crosslinkable composition adjacent to the substrate to form a first article. The method further includes exposing the crosslinkable composition to actinic radiation to form a second article having a crosslinked composition adjacent to the substrate. The crosslinkable composition and the crosslinked composition are the same as described in the first and second aspects above.

DETAILED DESCRIPTION

Crosslinkable polymeric materials, crosslinked polymeric materials, articles containing the crosslinkable polymeric materials or crosslinked polymeric materials, and methods of making the articles and various compositions are provided. More particularly, the crosslinkable composition contains a) a first polymeric material, which has terminal dithiocarbamate or dithiocarbonate groups, b) a crosslinking composition that includes a chlorinated triazine crosslinking agent and/or a crosslinking monomer having two or more ethylenically unsaturated groups, and c) a thixotropic agent that contains metal oxide particles. In some embodiments, the crosslinkable composition is printable or dispensable. In some embodiments, the crosslinked composition is a pressure-sensitive adhesive.

The terms "a", "an", and "the" are used interchangeably with "at least one" to mean one or more of the elements being described.

The term "and/or" means either or both. For example, "A and/or B" means only A, only B, or both A and B.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "polymerizable material" refers to unreacted monomers having at least one ethylenically unsaturated group. The term monomer includes any compound, regardless of its molecular weight, that has at least one ethylenically unsaturated group that can undergo radical polymerization.

The term "polymerized material" refers to the polymeric material formed from the polymerizable material.

The term "alkyl" refers to a monovalent group that is a radical of an alkane. The alkyl group can have 1 to 32 carbon atoms, 1 to 20 carbon atoms, 1 to 12 carbon atoms, or 1 to 6 carbon atoms. The alkyl can be linear, branched, cyclic, or a combination thereof. A linear alkyl has at least one carbon atoms while a cyclic or branched alkyl has at least 3 carbon atoms. In some embodiments, if there are greater than 12 carbon atoms, the alkyl is branched.

The term "alkoxy" refers to a monovalent group of formula $—OR^a$ where $R^a$ is an alkyl as defined above.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "substituted aryl" refers to an aryl group substituted with at least one alkyl group, at least one alkoxy group, or at least one halo. Multiple substituents of the same type or different types can be present. The substituted aryl group contains 6 to 40 carbon atoms. The substituted aryl group often contains an aryl group having 5 to 20 carbon atoms or 6 to 10 carbon atoms and an alkyl group and/or alkoxy group each having 1 to 20 carbon atoms or 1 to 10 carbon atoms and/or a halo.

The term "aralkyl" refers to an alkyl group substituted with at least one aryl group. That is, the aralkyl group is of formula —$R^d$—Ar where $R^d$ is an alkylene and Ar is an aryl. The aralkyl group contains 6 to 40 carbon atoms. The aralkyl group often contains an alkylene group having 1 to 20 carbon atoms or 1 to 10 carbon atoms and an aryl group having 5 to 20 carbon atoms or 6 to 10 carbon atoms.

The term "alkaryl" refers to an aryl group substituted with at least one alkyl group. That is, the alkaryl group is of formula —$Ar^1$—$R^e$ where $Ar^1$ is an arylene and $R^e$ is an alkyl. The alkaryl group contains 6 to 40 carbon atoms. The alkaryl group often contain an arylene group having 5 to 20 carbon atoms or 6 to 10 carbon atoms and an alkyl group having 1 to 20 carbon atoms or 1 to 10 carbon atoms.

The term "aryloxy" refers to a monovalent group that is of formula —OAr where Ar is an aryl group as defined above.

The term "aralkyloxy" refers to a monovalent group that is of formula —O—$R^d$—Ar with $R^d$ and Ar being the same as defined above for aralkyl.

The term "alkaryloxy" refers to a monovalent group of formula —O—$Ar^1$—$R^e$ where $Ar^1$ and $R^e$ being the same as defined above for alkaryl.

The term "alkenyl" refers to a monovalent group that is a radical of an alkene, which is a compound having at least one carbon-carbon double bond. In some embodiments, the alkenyl has a single carbon-carbon double bond. In some more specific embodiments, the alkenyl has an ethylenically unsaturated group (the carbon-carbon double bond is between the last two carbon atoms in a chain). The alkenyl can be linear, branched, or cyclic. The alkenyl typically has 2 to 20 carbon atoms, 2 to 10 carbon atoms, or 2 to 6 carbon atoms.

The term "alkenyloxy" refers to a monovalent group of formula —$OR^b$ where $R^b$ is an alkenyl as defined above.

The term "halo" refers to chloro, bromo, fluoro, or iodo.

The term "heterocyclic ring" refers to a ring structure having carbon atoms and at least 1 heteroatom selected from oxygen, nitrogen, or sulfur, wherein the ring structure is saturated or unsaturated. The heterocyclic ring typically has 5 to 7 ring atoms and 1 to 3 heteroatoms. The heterocyclic ring can optionally be fused to one or more second rings that are carbocyclic or heterocyclic and that can be saturated or unsaturated. Any of the rings can optionally be substituted with an alkyl group.

The term "(meth)acryloyl" refers to a group of formula $CH_2$=$CHR^b$—(CO)— where $R^b$ is hydrogen or methyl and the group —(CO)— refers to a carbonyl group.

The term "(meth)acrylate" refers to an acrylate, a methacrylate, or both. Likewise, the term "(meth)acrylamide" refers to an acrylamide, a methacrylamide, or both and the term "(meth)acrylic acid" refers to acrylic acid, methacrylic acid, or both.

The terms "in a range of" or "in the range of" are used interchangeably to refer to all values within the range plus the endpoints of the range.

The crosslinkable composition contains a polymeric material having terminal thiocarbonylthio-containing groups, a crosslinking composition, and a thixotropic agent. The viscosity of the crosslinkable composition is often selected so that it can be printed or dispensed onto a substrate. After application to a substrate, the crosslinkable composition can be crosslinked by exposure to actinic radiation such as ultraviolet radiation. In some embodiments, the resulting crosslinked composition is a pressure-sensitive adhesive. As such, articles containing a printed or dispensed pressure-sensitive adhesive composition are provided.

The terms "printed" or "dispensed" refer to different technologies used to apply a composition to a substrate. Dispensing typically implies that the composition being dispensed is forced through some sort of nozzle and/or tube before contacting the substrate. It also does not imply anything about patterning. Something being dispensed may or may not be in the form of a pattern. In some situations, a composition can be dispensed to simply fill a space like a groove, hole, cavity, plate, or slot. Printing often implies that the process of applying the composition to the substrate is done to form a self-standing pattern (i.e., the composition does not spread excessively on the substrate surface such that the pattern is destroyed or not apparent). Printing often includes moving-head printing (jetting or other nozzle-based printing), which are like those used for dispensing, in which the pattern is imparted by moving the printing head. However, printing also includes various static printing methods like flexographic printing, stencil printing, and screen printing, which are very dissimilar to dispensing. In these methods, the pattern is imparted by an existing pattern on the printing equipment.

The crosslinkable composition contains a first polymeric material of Formula (II).

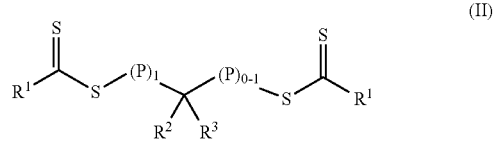

(II)

In the first polymeric material of Formula (II), $(P)_1$ means that there is one polymeric group and $(P)_{0-1}$ means that there are 0 or 1 polymeric groups. That is, depending on the specific group —$CR^2R^3$—, the polymeric material of Formula (II) can have polymeric material on one side of the group —$CR^2R^3$— as shown in Formula (II-P1) or on both sides of the group —$CR^2R^3$— as shown in Formula (II-P2).

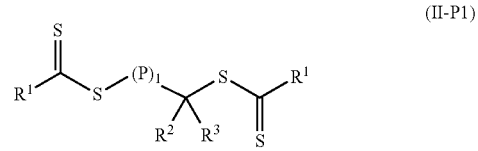

(II-P1)

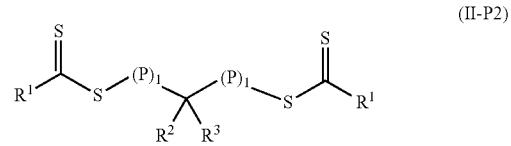

(II-P2)

For polymeric materials of Formula (II), some are Formula (II-P1) in the early stages of polymerization but are of Formula (II-P2) later in the polymerization process, some are of Formula (II-P2) during most of the polymerization process, and some are of Formula (II-P1) during most of the polymerization process. The polymeric materials can include a mixture of polymers of Formula (II-P1) and Formula (II-P2). Each polymeric group P contains a polymerized product of a first monomer composition containing a first monomer having a single ethylenically unsaturated group. The length of each polymeric group may be the same or different. Each polymeric group P can be a homopolymer or a copolymer. If P is a copolymer, it is typically a random copolymer.

In the polymeric materials of Formula (II), each $R^1$ is an alkoxy, aralkyloxy, alkenoxy, or —$N(R^4)_2$. Group $R^2$ is of formula —$(OR^5)_q$—$OR^6$ or of formula —(CO)—X—$R^7$. Group $R^3$ is hydrogen, alkyl, aryl, substituted aryl (i.e., an aryl substituted with at least one alkyl, alkoxy, or halo), alkaryl, a group of formula —(CO)—$OR^8$, or a group of formula —(CO)—$N(R^9)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group $R^{10}$ is hydrogen, alkyl, aryl, aralkyl, or alkaryl. Group X is a single bond, oxy, or —$NR^{10}$—.

More particularly, the polymeric material of Formula (II) is formed by preparing a first reaction mixture that contains a first monomer composition and a photoinitiator of Formula (I).

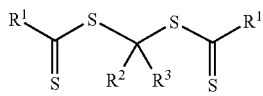
(I)

In Formulas (I), groups $R^1$, $R^2$, and $R^3$ are the same as described above for the polymeric material of Formula (II). The first monomer composition includes a first monomer having a single ethylenically unsaturated group.

In some embodiments of Formulas (I) and (II), each $R^1$ is an alkoxy, aralkyloxy, alkenoxy. Suitable alkoxy groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkoxy groups have 1 to 20 carbon atoms, 1 to 10 carbon atoms, 2 to 10 carbon atoms, 1 to 6 carbon atoms, 2 to 6 carbon atoms, or 1 to 4 carbon atoms. Suitable aralkyloxy groups typically contains an alkylene group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyloxy group is often phenyl. Suitable alkenoxy groups typically have at least 2 carbon atoms, at least 3 carbon atoms, or at least 4 carbon atoms and can have up to 20 carbon atoms, up to 18 carbon atoms, up to 16 carbon atoms, up to 12 carbon atoms, up to 10 carbon atoms, or up to 6 carbons. Some example alkenoxy groups have 2 to 20 carbon atoms, 2 to 10 carbon atoms, 2 to 8 carbon atoms, 2 to 6 carbon atoms, or 2 to 4 carbon atoms.

Such photoinitiators of Formula (I) and the resulting polymeric material of Formula (II) are of Formula (I-A) and Formula (II-A) respectively.

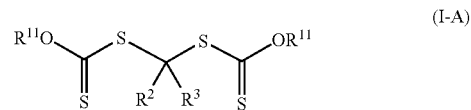
(I-A)

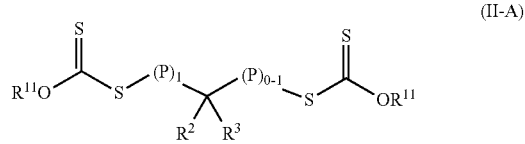
(II-A)

The group —$OR^{11}$ is an alkoxy, alkaryloxy, or alkenoxy with group $R^{11}$ being an alkyl, alkaryl, or alkenyl. Groups $R^2$, $R^3$, $(P)_1$, and $(P)_{0-1}$ are the same as in Formula (I) and Formula (II). The photoinitiators of Formula (I-A) are bis-dithiocarbonate compounds having a single carbon atom between the two dithiocarbonate groups. In many embodiments of Formula (I-A) and Formula (II-A), the group —$OR^{11}$ is an alkoxy ($R^{11}$ is an alkyl).

In other embodiments of Formulas (I) and (II), group $R^1$ is of formula —$N(R^4)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated (e.g., partially or fully unsaturated) and optionally fused to one or more second rings that are carbocyclic or heterocyclic. Suitable alkyl groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When the formula —$N(R^4)_2$ forms a first heterocyclic ring, the heterocyclic ring typically has a first ring structure with 5 to 7 ring members or 5 to 6 ring members and with 1 to 3 heteroatoms or 1 to 2 heteroatoms in the ring. If there is one heteroatom in the first ring structure, the heteroatom is nitrogen. If there are two or three heteroatoms in the first ring structure, one heteroatom is nitrogen and the any additional heteroatom is selected from nitrogen, oxygen, and sulfur. The first ring optionally can be fused to one or more second rings structure that are heterocyclic or carbocyclic and saturated or unsaturated (e.g., partially or fully unsaturated). If the second ring structure is heterocyclic, it typically has 5 to 7 or 5 to 6 ring members and 1, 2, or 3 heteroatoms selected from nitrogen, oxygen, and sulfur with the remainder of the ring atoms being carbon. If the second ring structure is carbocyclic, it is often benzene or a saturated ring having 5 or 6 ring members. In many embodiments, the heterocyclic ring has a single ring structure with 5 or 6 ring members and with either 1 or 2 heteroatoms in the ring. Examples of heterocyclic rings include, but are not limited to, morpholino, thiomorpholino, pyrrolidinyl, piperidinyl, homo-piperidinyl, indolyl, carbazolyl, imidazolyl, and pyrazolyl.

Such photoinitiators of Formula (I) and the resulting polymeric material of Formula (II) are of Formula (I-B) and Formula (II-B) respectively.

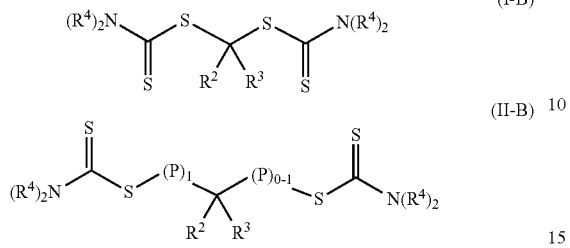

The groups $R^2$, $R^3$, $R^4$, $(P)_1$, and $(P)_{0-1}$ are the same as in Formulas (I) and (II). In many embodiments of Formula (I-B) and Formula (II-B), each $R^4$ is an alkyl.

Group $R^2$ in both Formulas (I) and (II) are a group of formula $-(OR^5)_q-OR^6$ or a group of formula $-(CO)-X-R^7$. Groups $R^5$, $R^6$, X, and $R^7$ as well as variable q are further described below.

In some embodiments of Formulas (I) and (II), group $R^2$ is of formula $-(OR^5)_q-OR^6$. In formula $-(OR^5)_q-OR^6$, the variable q is an integer equal to at least 0. Stated differently, $R^2$ forms an ether or polyether group with the carbon atom to which it is attached (i.e., the carbon atom between the two dithiocarbamate or dithiocarbonate groups). In many embodiments, q is equal to 0, at least 1, at least 2, or at least 3 and up to 20 or more, up to 10, up to 8, up to 6, up to 4, or up to 2. For example, q can be in a range of 0 to 20, 0 to 10, 0 to 6, 0 to 4, or 0 to 2. When q is equal to 0, $R^2$ is equal to a group of formula $-OR^6$. Group $R^6$ is an alkyl. Group $R^5$, if present, is an alkylene. Suitable alkyl and alkylene groups for $R^5$ and $R^6$ typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and alkylene groups have 1 to 20 carbon atoms, 1 to 10 carbon atoms, 2 to 10 carbon atoms, 1 to 6 carbon atoms, 2 to 6 carbon atoms, or 1 to 4 carbon atoms. In many examples, where $R^2$ is of formula $-(OR^5)_q-OR^6$, q is 0 and $R^2$ is of formula $-OR^6$.

In other embodiments of Formulas (I) and (II), group $R^2$ is of formula $-(CO)-X-R^7$ where $R^7$ is hydrogen, alkyl, aryl, substituted alkyl, or alkaryl and where X is a single bond, oxy or $-NR^{10}-$ with $R^{10}$ being hydrogen, alkyl, aryl, aralkyl, or alkaryl. That is, $R^2$ is an ester group when X is oxy, an amide group when X is $-NR^{10}-$, and a ketone group when X is a single bond. When $R^7$ and/or $R^{10}$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When $R^7$ and/or $R^{10}$ is an aryl, the aryl often has 5 to 12 carbon atoms, 6 to 12 carbon atoms, or 6 to 10 carbon atoms. The aryl is often phenyl. When $R^7$ and/or $R^{10}$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms.

The arylene group in the alkaryl group is often phenylene or biphenylene. When $R^{10}$ is an aralkyl, the aralkyl group often contains an alkyl group having 1 to 10 carbon atoms, 1 to 6 carbon atoms, or 1 to 4 carbon atoms and an arylene group having 5 to 12 carbon atoms, 6 to 12 carbon atoms, or 6 to 10 carbon atoms. The aryl group in the aralkyl group is often phenyl. When $R^7$ is a substituted aryl, it can be substituted with an alkyl, alkoxy, or halo. The alkyl and alkoxy substitution group often have 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The halo substitution group can be chloro, bromo, fluoro, or iodo.

Often, when $R^2$ is a group of formula $-(CO)-X-R^7$, $R^7$ is an alkyl. Group X is often a single bond, oxy, or $-NH-$.

In many embodiments of Formulas (I) and (II), the group $R^3$ is hydrogen. That is, Formula (I) is often of Formula (I-1) and Formula (II) is often of Formula (II-1).

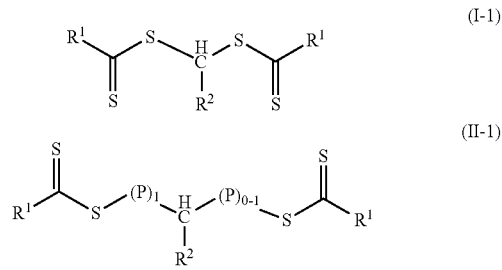

Further, in many embodiments of Formula (II-1), there is a polymeric group on each side of the group $-CHR_2-$ and the polymeric material is of Formula (II-1A).

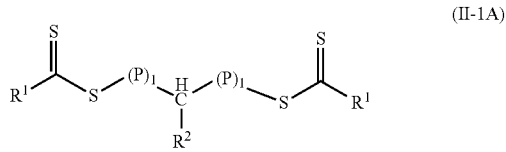

In other embodiments of Formulas (I) and (II), group $R^3$ is an alkyl, aryl, aralkyl, alkaryl, a group of formula $-(CO)-OR^8$, or a group of formula $-(CO)-N(R^9)_2$. Groups $R^8$ and $R^9$ are each an alkyl, aryl, aralkyl, alkaryl. Where $R^3$ and/or $R^8$ and/or $R^9$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. Where $R^3$ and/or $R^x$ and/or $R^9$ is an aryl, the aryl often has 5 to 12 carbon atoms, 6 to 12 carbon atoms, or 6 to 10 carbon atoms. The aryl is often phenyl. When $R^3$ and/or $R^8$ and/or $R^9$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. When Where $R^3$ and/or $R^8$ and/or $R^9$ is an aralkyl, the aralkyl group often contains an alkylene group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl.

In some specific embodiments, the photoinitiator is of Formula (I-1)

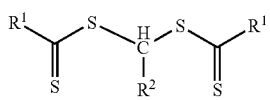
(I-1)

where each $R^1$ is either an alkoxy or a group of formula $-N(R^4)_2$ where each $R^4$ is an alkyl. In these embodiments, $R^2$ is an alkoxy of formula $-OR^6$, an ester group of formula $-(CO)-O-R^7$, an amide group of formula $-(CO)-NH-R^7$, or a ketone group of formula $-(CO)-R^7$. Group $R^7$ is often an alkyl.

The photoinitiators of Formula (I) can be formed using any suitable method. One such method is shown in Reaction Scheme A for compounds where $R^2$ is of formula $-(OR^5)_q-OR^6$. In many such compounds, q is zero and $R^2$ is $-OR^6$.

Reaction Scheme A

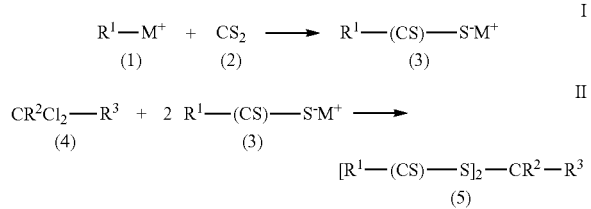

In reaction II, a compound of formula (4) is reacted with a compound of formula (3) to prepare the compound of formula (5), which corresponds to Formula (I) above. Reaction II is typically conducted at temperatures between about 0° C. and about 80° C. in the presence of an organic solvent such as acetone, acetonitrile, or an alcohol. The compound of formula (3) can be formed, for example, by treating a salt of formula (1) with carbon disulfide (Reaction I). Compound (1) is a salt of an alkoxide, aryloxide, or amine where M+ is an alkali metal, a tetralkyl ammonium ion, a trialkyl ammonium ion, or a dialkylammonium ion.

In some examples of Reaction Scheme A, a commercially available compound (4) is reacted with a commercially available compound (3). Commercially available examples of compound (4) include, but are not limited to, dichloromethyl methyl ether, dichloromethyl butyl ether, methyl dichloromethoxyacetate. Commercially available examples of compound (3) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

Another method is shown in Reaction Scheme B for preparing compounds of Formula (I) where $R^2$ is an amide or ester group of formula $-(CO)-X-R^7$ and $R^3$ is hydrogen.

Reaction Scheme B

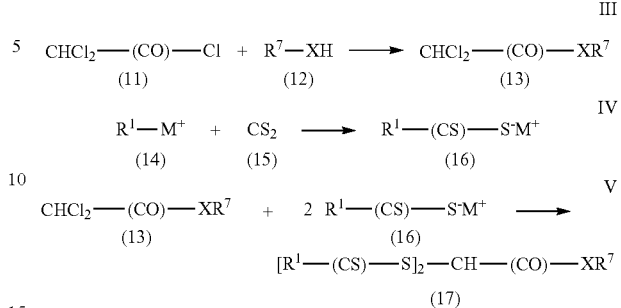

In this reaction scheme, dichloroacetyl chloride (compound (11)) is reacted (Reaction III) with a compound of formula $R^7-XH$ (compound (12)), which is an alcohol ($R^7-OH$) or an amine ($R^7-NR^{10}H$). That is, X is either oxy or $-N(R^{10})-$. Reaction III often is conducted in the presence of a base such as, for example, trimethylamine and a catalyst such as, for example, pyridine or dimethylaminopyridine. Any organic solvent that is present is usually an aprotic solvent such as methylene chloride or tetrahydrofuran. The product of Reaction III is compound (13) of formula $CHCl_2-(CO)-XR^7$. Compound (13) is reacted (Reaction V) with compound (16), which can be formed by the reaction (Reaction IV) of a compound of formula $R^1-M^+$ (compound (14)) with carbon disulfide (15). Compound (14) is a salt of an alkoxide or of an amine where $M^+$ is usually an alkali metal ion, a tetra-alkyl ammonium ion, a trialkyl ammonium ion, or a dialkylammonium ion. The reaction (Reaction V) of compound (13) with compound (16) is typically conducted at temperatures between about 0° C. and about 80° C. in the presence of an organic solvent such as acetone, acetonitrile, or an alcohol.

In some examples of Reaction Scheme B, commercially available compounds of formula $CHCl_2-(CO)-XR^7$, which is compound (13), are reacted with commercially available compounds of formula $R^1-(CS)-S^-M^+$, which is compound (16). Examples of commercially available compound (13) include, but are not limited to, methyl dichloroacetate, ethyl dichloroacetate, and butyl dichloroacetate. Examples of commercially available compound (16) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

Another method of forming the photoinitiators of Formula (I) is shown in Reaction Scheme C for compounds where $R^2$ is a ketone group of formula $-(CO)-R^7$ and $R^3$ is hydrogen. To be a ketone group, X in the formula $-CO-X-R^7$ is a single bond.

Reaction Scheme C

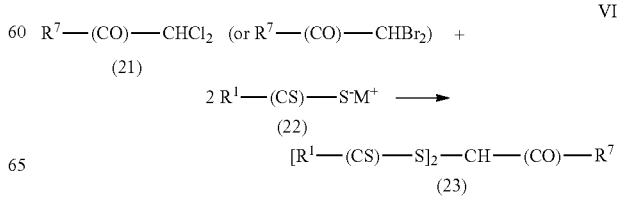

In this reaction scheme, a dichloro compound or a dichloro compound (compound (21)) is reacted (Reaction VI) with a compound of formula R¹—(CS)—S⁻M⁺, which is compound (22). The compound of formula R¹—(CS)—S⁻M⁺ can be prepared as described above for Reaction Schemes A and B. The reaction (Reaction VI) of compound (21) with compound (22) is typically conducted at temperatures between about 0° C. and about 80° C. in the presence of an organic solvent such as acetone, acetonitrile, or an alcohol.

In some examples of Reaction Scheme C, commercially available compounds of formula R⁷—(CO)—CHCl₂ and R⁷—CO—CHBr₂ (compound (21)) include 1,1-dichloropropan-2-one, 2,2-dichloro-1-phenyl-ethanone, 2,2-dibromo-1-(4-bromophenyl)ethenone, 1,1-dichloro-3,3-dimethyl-2-butanone, and 1,1-dichloro-3,3-dimethyl-2-butanone. Examples of commercially available compound (22) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

In some embodiments of the photoinitiator of Formula (I), group R¹ is an alkoxy, aryloxy, aralkyloxy, or alkenoxy group. Such R¹ groups are of formula —OR¹¹ where R¹¹ is an alkyl, aralkyl, or alkenyl group. That is the photoinitiator is of Formula (I-A).

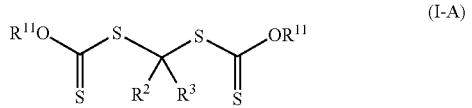

(I-A)

These photoinitiators are bis-dithiocarbonate compounds having a single carbon atom between the two dithiocarbonate groups.

In some other more specific compounds of Formula (I-A), R¹¹ is an alkenyl (i.e., —OR¹¹ is an alkenoxy), R² is an alkoxy (R² is of formula —(OR⁵)$_q$—OR⁶ where q is zero, which is equal to —OR⁶), and R³ is hydrogen. A specific example compound includes, but it not limited to, 1,1-bis(10-undecenyloxycarbothioylsulfanyl)methyl ether.

In other more specific compounds of Formula (I-A), R¹¹ is an alkyl (i.e., —OR¹¹ is an alkoxy), R² is an alkoxy (R² is of formula —(OR⁵)$_q$—OR⁶ where q is zero, which is equal to —OR⁶), and R³ is of formula —(CO)—OR⁸ where R⁸ is an alkyl. A specific example is methyl 2,2-bis(isopropoxycarbothioylsulfanyl)-2-methoxy-acetate.

In some embodiments of Formula (I-A), R³ is hydrogen, R² is an alkoxy (R² is of formula —(OR⁵)$_q$—OR⁶ where q is zero, which is equal to —OR⁶), and R¹ of Formula (I) is an alkoxy, aralkyloxy, or alkenyloxy. Such photoinitiators are of Formula (I-A1).

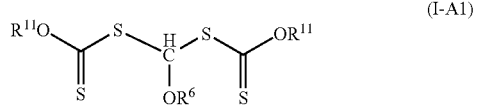

(I-A1)

Groups —OR¹¹ is an alkoxy, aralkyloxy, or alkenyloxy and R¹¹ is an alkyl, aralkyl, or alkenyl. In many embodiments of Formula (I-A1), R²⁰ is an alkyl. Specific example compounds include, but are not limited to, 1,1-bis(isopropoxycarbothioylsulfanyl)methyl methyl ether, 1,1-bis(isopropoxycarbothioylsulfanyl)methyl butyl ether, or 1,1-bis(ethoxycarbothioylsulfanyl)methyl butyl ether.

In other embodiments of Formula (I-A), R³ is hydrogen, R² is a group of formula —(CO)—X—R⁷, and R¹ is an alkoxy, aralkyloxy, or alkenyloxy. Such photoinitiators are of Formula (I-A2).

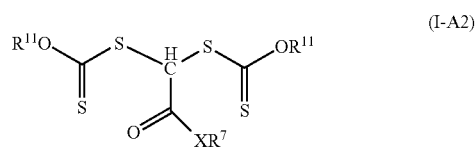

(I-A2)

Groups —OR¹¹ is an alkoxy, aralkyloxy, or alkenyloxy and R¹¹ is an alkyl, aralkyl, or alkenyl. The group R¹¹ is often an alkyl. Examples of compounds of Formula (I-A2) where X is equal to oxy and R⁷ is an alkyl include, but are not limited to, 2-ethylhexyl 2,2-bis(isopropoxycarbothioylsulfanyl)acetate, methyl 2,2-bis(isopropoxycarbothioylsulfanyl)acetate, and tert-butyl 2,2-bis(isopropoxycarbothioylsulfanyl) acetate. An example compound of Formula (I-A2) where X is a single bond and R⁷ is an alkyl is 1,1-bis(isopropoxycarbothioylsulfanyl)-2-propanone.

Examples of compounds of Formula (I-A2) where X is a single bond and R⁷ is an aryl or substituted aryl are 2,2-bis(isopropoxycarbothioylsulfanyl)-1-phenyl ethanone and 2,2-bis(isopropoxycarbothioylsulfanyl)-1-4-bromphenyl)ethenone. An example of a compound of Formula (I-A2) where X is equal to oxy and R⁷ is an aryl is phenyl 2,2-bis(isopropoxycarbothioylsulfanyl)acetate. An example of a compound of Formula (I-A2) where X is equal to —NR¹⁰— is N,N-dibutyl-2,2-bis(isopropoxycarbothioylsulfanyl)acetamide. In this compound both R⁷ and R¹⁰ are alkyl groups.

In other embodiments of the photoinitiator of Formula (I), group R¹ is of formula —N(R⁴)₂.

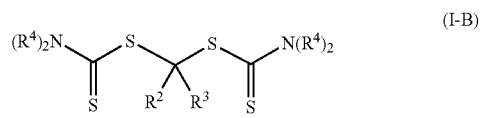

(I-B)

These photoinitiators are bis-dithiocarbamate compounds having a single carbon atom between the two dithiocarbonate groups.

In some embodiments of Formula (I-B), R³ is hydrogen and R² is an alkoxy (R² is of formula —(OR⁵)—OR⁶ where p is zero, which is equal to —OR⁶). Such photoinitiators are of Formula (I-B1).

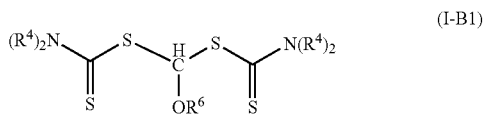

(I-B1)

In many such compounds, each R⁴ is an alkyl. Specific example compounds include, but are not limited to, 1,1-bis(diethylcarbamothioylsulfanyl)methyl butyl ether and 1,1-bis(diethylcarbamothioylsulfanyl)methyl methyl ether.

In other embodiments of Formula (I-B), R³ is hydrogen and R² is a group of formula —(CO)—X—R⁷. Such photoinitiators are of Formula (I-B2).

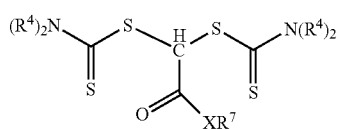

(I-B2)

The group $R^1$ is often an alkyl. Examples of compounds of Formula (I-B2) where X is equal to oxy and $R^7$ is an alkyl include, but are not limited to, 2-ethylhexyl 2,2-bis(diethylcarbamothioylsulfanyl)acetate, methyl 2,2-bis(diethylcarbamothioylsulfanyl)acetate, and octyl 2,2-bis(diethylcarbamothioylsulfanyl)acetate.

The polymeric material of Formula (II) is formed by a first reaction mixture that includes the photoinitiator of Formula (I) and a first monomer composition. While not wishing to be bound by theory, it is believed that polymerization occurs as shown in Reaction Scheme D to form the polymeric material of Formula (II).

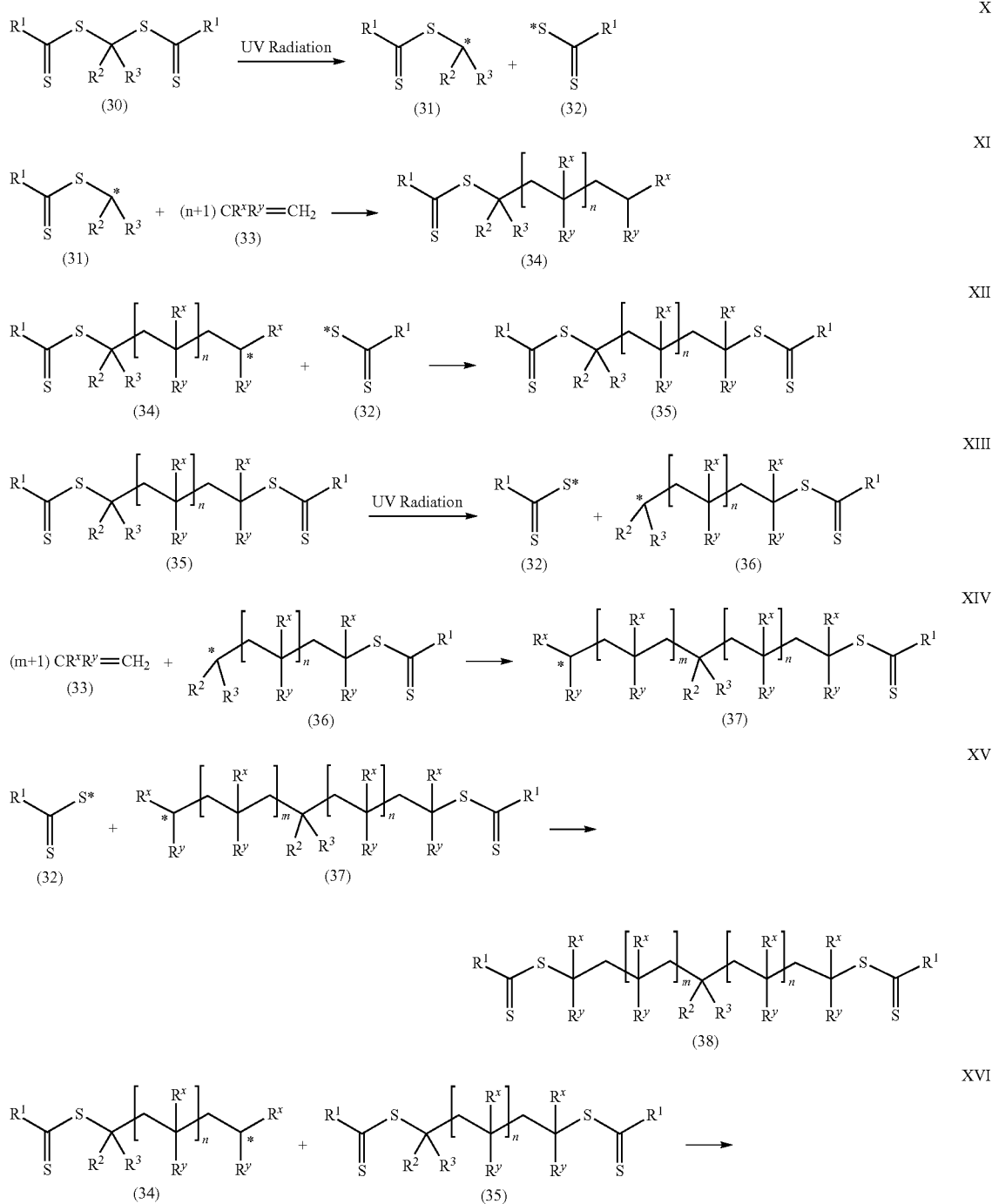

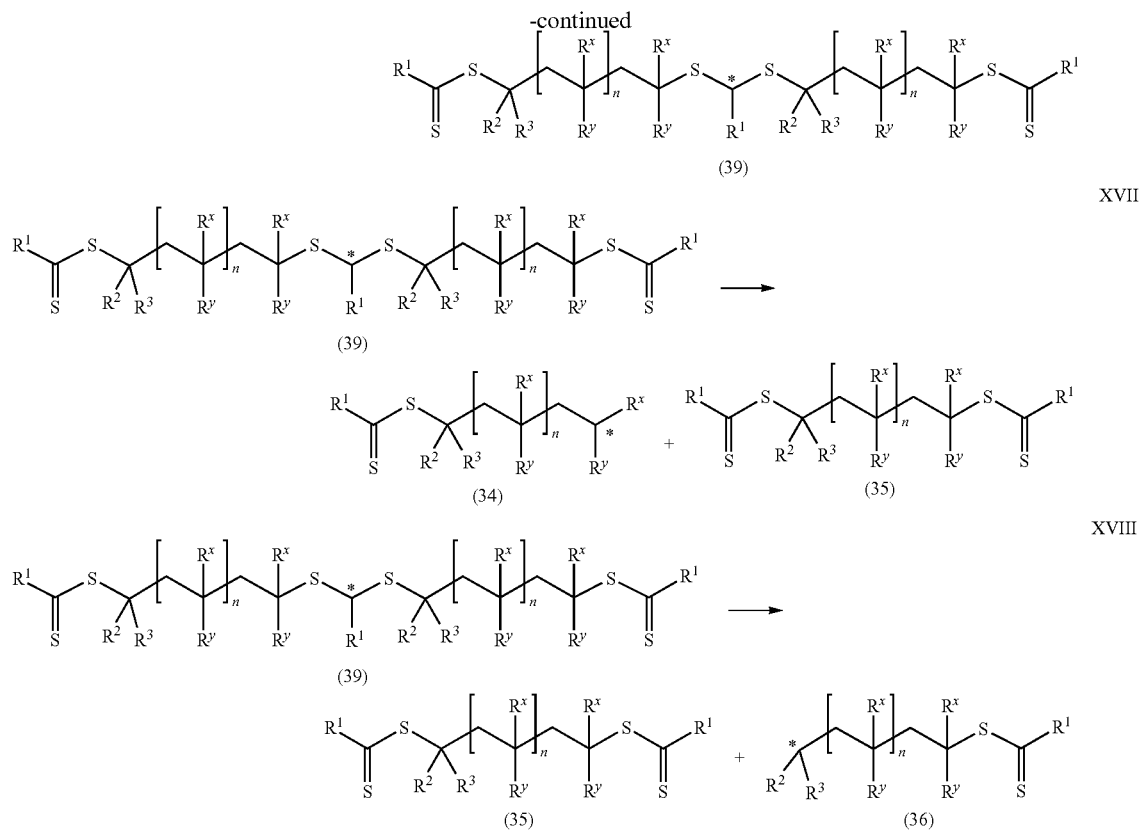

In Reaction Scheme D, the photoinitiator of Formula (I), which is shown as compound (30), undergoes photolysis of one of the C—S bonds when exposed to actinic radiation (e.g., ultraviolet radiation) (Reaction X). Two different radicals, the radical (31) and the radical (32), are formed in Reaction X. In Reaction XI, radical (31) reacts with ethylenically unsaturated monomers (compound (33)). The monomers polymerize and radical (34) is formed. The radical (34) can combine with a radical (32) and the polymerization reaction is terminated. The resulting polymeric material of Reaction XII is compound (35). Compound (35) corresponds to the polymeric material of Formula (II) where there is polymeric material on only one side of the —CR$^2$R$^3$— group; the polymeric material is mono-directional. Compound (35) can undergo photolysis at one of the C—S bonds in the presence of actinic radiation (e.g., ultraviolet radiation). Photolysis can result in the generation of radical (32) and radical (36) as shown in Reaction XIII. In Reaction XIV, radical (36) reacts with ethylenically unsaturated monomers (compound 33). The monomers polymerize and radical (37) is formed. The radical (37) can combine with radical (32) and the polymerization reaction is terminated. The resulting polymeric material formed in Reaction XV is compound (38). Compound (38) corresponds to the polymeric material of Formula (II) where there is polymeric material on both sides of the —CR$^2$R$^3$— group; the polymeric material is bi-directional. While exposure to actinic radiation (e.g., ultraviolet radiation) continues, photolysis of compound (38) can occur and additional monomeric units can be added. When exposure to actinic radiation (e.g., ultraviolet radiation) is terminated, no further photolysis can occur and no additional monomeric units can be added.

Additionally, the dithiocarbonate or dithiocarbamate chain end may be directly transferred between polymeric chains in an addition-fragmentation process. In Reaction XVI, for example, radical (34) combines with another molecule of compound (35) to generate radical (39). In Reaction XVII, radical (39) undergoes homolysis of a carbon-sulfur bond to regenerate radical (34) and compound (35). In Reaction XVIII, radical (39) undergoes homolysis on the opposite side of the dithiocarbonate or dithiocarbamate group to generate compound (35) and radical (36), a net transfer of the dithiocarbonate or dithiocarbamate group.

In Reaction Scheme D, compound (33) is a monomer having a single ethylenically unsaturated group. If the ethylenically unsaturated group is a (meth)acryloyl group, R$^X$ is hydrogen or methyl and R$^Y$ includes a group —(CO)—X—R$^Z$. Group X is oxy or —NR$^{12}$— where R$^{12}$ is hydrogen or alkyl. Group R$^Z$ is the remainder of the (meth)acryloyl-containing monomer. That is, the monomer is of formula H$_2$C=CR$^X$—(CO)—X—R$^Z$ where group R$^X$ is hydrogen or methyl and group R$^Z$ is the remainder, for example, of any (meth)acrylate monomer described herein.

The first reaction mixture typically does not include any other initiator other than the photoinitiator of Formula (I). That is, there is no thermal initiator such as an azo initiator, peroxide initiator, redox initiator, or persulfate initiator. No other photoinitiator other than those of Formula (I) is included in the reaction mixtures. Exposing the first reaction mixture to ultraviolet radiation causes photolysis of the photoinitiator of Formula (I) and permits controlled radical polymerization of the first monomer composition and formation of a polymeric group P. When exposure to ultraviolet radiation is terminated, the first polymerization reaction ceases by reaction with a radical of formula R$^1$—(CS)—S*.

The polymerized product of first reaction mixture is a polymeric material of Formula (II).

The first monomer composition contains at least one first monomer having a single ethylenically unsaturated group. Any monomer having a single ethylenically unsaturated group can be used based on the desired properties of the resulting polymeric material. In some embodiments, all the monomers used to form the polymeric group have a single (meth)acryloyl group. In other embodiments, all the monomers used to form the polymeric group have a single ethylenically unsaturated group that is not a (meth)acryloyl group. In still other embodiments, all the monomers used to form the polymeric group have a single ethylenically unsaturated group and some, but not all, of the ethylenically unsaturated groups are (meth)acryloyl groups. Each polymeric group can be a homopolymer or a copolymer. That is, any monomer can be used alone or in combination with other monomers to form each polymeric group.

Suitable monomers with a single (meth)acryloyl group that can be used to form the polymeric material of Formula (II) include, but are not limited to, alkyl (meth)acrylates, fluorinated alkyl (meth)acrylates, aryl (meth)acrylates, aralkyl (meth)acrylates, substituted aryl (meth)acrylates, (meth)acrylic acid, (meth)acrylamide, N-alkyl (meth)acrylamide, N,N-dialkyl (meth)acrylamide, N-alkylaminoalkyl (meth)acrylate, N,N-dialkylaminoalkyl (meth)acrylate, N-alkylaminoalkyl (meth)acrylamide, N,N-dialkylaminoalkyl (meth)acrylamide, hydroxy-substituted alkyl (meth)acrylates, hydroxy-substituted alkyl (meth)acrylamides, alkoxylated alkyl (meth)acrylate, acid-substituted alkyl (meth)acrylates, acid-substituted alkyl (meth)acrylamides, glycidyl-containing (meth)acrylates, aminosulfonyl-containing (meth)acrylates, isocyanate-containing (meth)acrylates, and mixtures thereof.

In other embodiments, the first reaction mixture used to form the polymeric group in the polymeric material of Formula (II) includes a monomer composition containing a monomer having a single ethylenically unsaturated group that is not a (meth)acryloyl group. Suitable such monomers include, but are not limited to, N-vinylpyrrolidone, N-vinylcaprolactam, vinyl acetate, vinyl methyl ether, vinyl-2-ethylhexanoate, vinyl neodecanoate, styrene, isoprene, butadiene, vinyl dimethylazlactone (VDM), isopropenyl dimethylazlactone (IDM), and vinyl oxazole, and the like.

More specifically, to prepare the polymeric material of Formula (II), a first monomer composition is mixed with a photoinitiator of Formula (I) to form a first reaction mixture. The first reaction mixture can be neat (i.e., no solvent is present) or can be mixed with a solvent that dissolves both the first monomer composition and the photoinitiator of Formula (I). The solvent can be added, for example, to lower the viscosity of the first reaction mixture. Any solvent that is added is usually selected so that the growing polymeric material is also soluble. In some embodiments, the percent solids in first reaction mixture is at least 10 weight percent, at least 20 weight percent, at least 30 weight percent, or at least 40 weight percent and up to 100 weight percent, up to 80 weight percent, or up to 60 weight percent. The amount of solvent added is often selected based on the desired viscosity, particularly the viscosity of the polymerized material.

If a solvent is added, the solvent is often an ester (e.g., ethyl acetate, butyl acetate, and ethylene glycol monomethyl ether acetate), an ether (e.g., dimethyl ether, diethyl ether, ethyl propyl ether, dipropyl ether, methyl t-butyl ether, di-t-butyl ether, dimethoxy ethane, 2-methoxyethanol, diethylene glycol dimethyl ether, dioxane, and tetrahydrofuran), acetonitrile, methylene chloride, an aromatic hydrocarbon (e.g., benzene, xylene, and toluene), or a ketone (e.g., acetone, methyl ethyl ketone, cyclopentanone, and cyclohexanone). Mixtures of solvents can be used. Further, one or more solvents can be combined with water, if miscible. Polymerization of the first monomer composition can start at room temperature (e.g., about 20° C. to 25° C.) but can also start, if desired at higher or lower temperatures.

The first reaction mixture is exposed to ultraviolet radiation to activate the photoinitiator of Formula (I) and commence controlled radical polymerization of the first monomer composition. The resulting polymeric group can be a homopolymer or a random copolymer.

At any point during the polymerization reaction, additional monomers can be added to alter the chemical composition along the polymeric chain within the polymeric group P. If distinct blocks are desired, the polymerization is typically allowed to proceed until at least 80 weight percent of the monomers in the first monomer composition have undergone controlled radical polymerization before addition of other monomers. That is, the polymerization reaction can proceed until at least 85 weight percent, at least 90 weight percent, at least 95 weight percent, or even 100 weight percent of the first monomer composition has undergone controlled radical polymerization before additional monomers are added that are different than those originally present. The monomers added typically have a single ethylenically unsaturated groups.

In many embodiments, the only monomers included in the first monomer composition have a single ethylenically unsaturated group. In other embodiments, however, small amounts of monomers with more than one ethylenically unsaturated groups can be added provided the concentration is sufficiently low so that the resulting polymeric material does not gel and increase in viscosity due to crosslinking. If the concentration is sufficiently low, the monomers with more than one ethylenically unsaturated group can cause branching rather than crosslinking of the polymeric chains. There can be side chains introduced with ethylenically unsaturated groups. Alternatively, if the first monomer composition is only partially polymerized (e.g., a syrup polymer is formed), the crosslinking monomer may remain unreacted.

If no further monomers are to be added prior to crosslinking, polymerization of the first reaction mixture can be allowed to proceed to any desired extent until at least 5 weight percent of the first monomer composition has undergone controlled radical polymerization. For example, the polymerization reaction can proceed until at least 10 weight percent, at least 20 weight percent, at least 30 weight percent, at least 40 weight percent and up to 100 weight percent, up to 99 weight percent, up to 98 weight percent, up to 95 weight percent, up to 90 weight percent, up to 85 weight percent, up to 80 weight percent or more, up to 70 weight percent, up to 60 weight percent, or up to 50 weight percent of the first monomer composition has undergone controlled radical polymerization.

The amount of the photoinitiator of Formula (I) included in the first reaction mixture block impacts the weight average molecular weight of the resulting polymeric material of Formula (II). That is, the weight average molecular weight of the polymeric material can be controlled based on the amount of photoinitiator added to the reaction mixture. The amount of photoinitiator is typically in a range of 0.001 to 5 weight percent based on the weight of the monomers in the first reaction mixture. For comparable reaction conditions, increasing the amount of photoinitiator tends to decrease the weight average molecular weight (as well as the number average molecular weight) of the polymeric material. The amount of the photoinitiator is typically at least 0.001 weight percent, at least 0.005 weight percent, at least 0.01 weight percent, at least 0.05 weight percent, at least 0.10 weight percent, or at least 0.50 weight percent and can be up to 5 weight percent, up to 4 weight percent, up to 3 weight percent, up to 2 weight percent, or up to 1 weight percent.

The weight average molecular weight of the polymeric material of Formula (II) is often at least 5,000 Daltons, at least 10,000 Daltons, at least 20,000 Daltons, at least 50,000 Daltons, or at least 100,000 Daltons and up to 500,000 Daltons, up to 400,000 Daltons, up to 350,000 Daltons, up to 300,000 Daltons, up to 250,000 Daltons, up to 200,000 Daltons, up to 150,000 Daltons, or up to 100,000 Daltons. The weight average molecular weight of the polymeric material of Formula (II) included in the crosslinkable composition is dependent on the desired viscosity and on the percent conversion of the first monomer composition to polymeric material. If the percent conversion is high (e.g., greater than 80 weight percent), the weight average molecular weight typically needs to be lower than when the percent conversion is lower such as in a range of 5 to 40 weight percent. That is, if the percent conversion is high, the weight average molecular weight will need to be relatively low to ensure that the viscosity is not too high (e.g., too high to dispense or print the crosslinkable composition). If the percent conversion is about 30 weight percent, the weight average molecular weight is often in a range of 50,000 to 200,000 Daltons or in a range of 50,000 to 100,000 Daltons. The weight average molecular weight can be determined using gel permeation chromatography as further explained in the Example section.

The first reaction mixtures used to form the polymeric material of Formula (II) typically do not include a chain transfer agent (such as mercaptans and carbon tetrabromide). Chain transfer agents are not needed to control the molecular weight of the resulting polymeric material. Rather, the molecular weight can be varied and controlled through selection of the desired amount of the photoinitiator of Formula (I) and of the desired light intensity.

The polymeric material of Formula (II) is combined with a crosslinking composition and a thixotropic agent to provide a crosslinkable composition. The crosslinking composition contains a chlorinated triazine crosslinking agent and/or a crosslinking monomer having at least two ethylenically unsaturated groups. Optionally, the crosslinking composition can also include one or more monomers having a single ethylenically unsaturated group.

The one or more monomers having a single ethylenically unsaturated group can be monomers that were included in the first monomer composition and not polymerized (i.e., unreacted) in the formation of the polymeric material of Formula (II). That is, the first monomer composition can be fully polymerized (e.g., greater than 99 weight percent polymerized based on the weight of monomers in the first monomer composition), nearly fully polymerized (e.g., at least 80 to 99 weight percent polymerized based on the weight of the monomers in the first monomer composition), or partially polymerized (e.g., 5 to 80 weight percent polymerized based on the weight of the monomers in the first monomer composition). Polymeric materials of Formula (II) formed from a partially polymerized first monomer composition are referred to as "syrup polymers".

Syrup polymers often includes 5 to 80 weight percent polymeric material of Formula (II) and 20 to 95 weight percent monomer having a single ethylenically unsaturated group based on a total weight of polymerized (i.e., reacted monomers from the first monomer composition) and polymerizable material (i.e., unreacted monomers from the first monomer composition). In some embodiments, the syrup polymer contains 10 to 80 weight percent polymeric material of Formula (II) and 20 to 90 weight percent monomer having a single ethylenically unsaturated group, 10 to 70 weight percent polymeric material of Formula (II) and 30 to 90 weight percent monomer having a single ethylenically unsaturated group, 10 to 60 weight percent polymeric material of Formula (II) and 40 to 90 weight percent monomer having a single ethylenically unsaturated group, 10 to 50 weight percent polymeric material of Formula (II) and 50 to 90 weight percent monomer having a single ethylenically unsaturated group, 10 to 40 weight percent polymeric material of Formula (II) and 60 to 90 weight percent monomer having a single ethylenically unsaturated group, 20 to 50 weight percent polymeric material of Formula (I) and 50 to 80 weight percent monomer having a single ethylenically unsaturated group, or 20 to 40 weight percent polymeric material of Formula (II) and 60 to 80 weight percent monomer having a single ethylenically unsaturated group. The amounts are based on a total weight of polymerized and polymerizable material.

If a syrup polymer is used in the crosslinkable composition, the crosslinking composition includes both 1) a chlorinated triazine crosslinking agent and/or a crosslinking monomer and 2) unreacted monomers that were present when the polymer of Formula (II) was formed. Optionally, the crosslinking composition can further include other monomers having a single ethylenically unsaturated group that were not present when the polymeric material of Formula (II) was formed.

Regardless of whether the polymeric material of Formula (II) is a syrup polymer, a nearly fully polymerized polymeric material, or a fully polymerized polymeric material, the crosslinkable composition contains a crosslinking composition. The crosslinking composition includes a chlorinated triazine crosslinking agent and/or a crosslinking monomer having at least two ethylenically unsaturated groups.

Suitable chlorinated triazine crosslinking agents are those described in U.S. Pat. No. 4,330,590 (Vesley) and U.S. Pat. No. 4,329,384 (Vesley). The chlorinated triazine crosslinking agents are often of Formula (III)

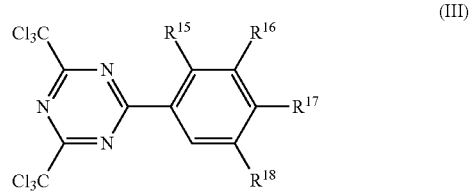

(III)

In Formula (III), each $R^{15}$, $R^{16}$, $R^{17}$, and $R^{18}$ is independently hydrogen, alkyl, alkoxy, or two adjacent alkoxy groups (i.e., $R^{15}$ and $R^{16}$, $R^{16}$ and $R^{17}$, or $R^{17}$ and $R^{18}$) can combine to form a ring structure. The alkyl and alkoxy groups typically have 1 to 10 carbon atoms, 1 to 6 carbon atoms, or 1 to 4 carbon atoms. If two adjacent alkoxy groups combine, the ring formed typically has 5 or 6 ring members. These compounds are further described in U.S. Pat. No. 4,330,590 (Vesley). These compounds may be prepared by the co-trimerization of an aryl nitrile with trichloroacetonitrile in the presence of HCl gas and a Lewis acid such as AlCl$_3$, AlBr$_3$, etc., as described in *Bull. Chem. Soc. Japan*, Vol. 42, page 2924 (1969).

Example chlorinated triazine crosslinking agents of Formula (IV) include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; and 2,4-bis(trichloromethyl)-6-(3-methoxy)phenyl)-s-triazine. In many embodiments, the chlorinated triazine crosslinking agent is 2,4-bis(trichloromethyl)-6-(4-methoxy)phenyl)-s-triazine.

Other suitable chlorinated triazine crosslinking agents are of Formula (IV) as described in U.S. Pat. No. 4,329,384 (Vesley).

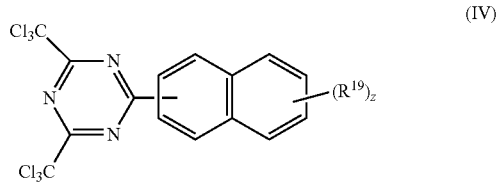

(IV)

In Formula (IV), the naphthyl group can be connected to the triazine portion of the compound any suitable position of a first ring. Group $R^{19}$ is an alkoxy or alkyl and there can be z such groups where z is equal to 0, 1, or 2. The group $R^{19}$ can be on any suitable carbon atom or atoms in the naphthyl group (i.e., $R^{19}$ can be on either ring). Suitable alkoxy and alkyl groups typically have 1 to 10 carbon atoms, 1 to 6 carbon atoms, or 1 to 4 carbon atoms. Examples include, but are not limited to, 2,4-bis(trichloromethyl)-6-naphthenyl-s-triazine and 2,4-bis(trichloromethyl)-6-(4-methoxy)naphthenyl-s-triazine.

Suitable crosslinking monomers contain at least two ethylenically unsaturated groups. The ethylenically unsaturated groups are often (meth)acryloyl groups. If it is miscible with the polymeric material of Formula (II), the crosslinking monomer can have any desired molecular weight (e.g., it can be an oligomer, if desired). Exemplary crosslinking monomers with two (meth)acryloyl groups include 1,2-ethanediol diacrylate, 1,3-propanediol diacrylate, 1,4-butanediol diacrylate, 1,4-butanediol diacrylate, 1,6-hexanediol diacrylate (HDDA), 1,9-nonanediol diacrylate, 1,12-dodecanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone. Exemplary crosslinking monomers with three or four (meth)acryloyl groups include, but are not limited to, trimethylolpropane triacrylate (e.g., commercially available under the trade designation TMPTA-N from Surface Specialties, Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (commercially available under the trade designation SR-368 from Sartomer), a mixture of pentaerythritol triacrylate and pentaerythritol tetraacrylate (e.g., commercially available from Surface Specialties under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinking monomer with five (meth)acryloyl groups includes, but is not limited to, dipentaerythritol pentaacrylate (e.g., commercially available under the trade designation SR-399 from Sartomer).

If a crosslinking monomer is used, the crosslinkable composition usually includes 0.01 to 20 weight percent crosslinking monomer based on a total weight of polymerized and polymerizable material. In many embodiments, the crosslinkable composition contains at least 0.05 weight percent, at least 0.1 weight percent, at least 0.5 weight percent, or at least 1 weight percent and up to 15 weight percent, up to 10 weight percent, up to 5 weight percent, or up to 1 weight percent crosslinking monomer based on the total weight of polymerized and polymerizable material. If the crosslinked composition is a pressure-sensitive adhesive, the crosslinkable composition often contains up to 5 weight percent, up to 3 weight percent, up to 2 weight percent, up to 1 weight percent, or up to 0.5 weight percent of the crosslinking monomer. Any other monomers included in the crosslinkable composition have a single ethylenically unsaturated group.

The crosslinkable composition contains 5 to 90 weight percent polymeric material of Formula (II) and a crosslinking composition containing 1) 0.01 to 20 weight percent crosslinking monomer having at least two ethylenically unsaturated groups and 2) 0 to 95 (0 to 94.99) weight percent monomer having a single ethylenically unsaturated group. In some embodiments, the crosslinkable composition contains 5 to 90 weight percent polymeric material of Formula (II) and a crosslinking composition containing 1) 0.01 to 10 weight percent crosslinking monomer having at least two ethylenically unsaturated groups and 2) 0 to 95 weight percent (0 to 94.99 weight percent) monomers having a single ethylenically unsaturated group. In other embodiments, the crosslinkable composition contains 10 to 90 weight percent polymeric material of Formula (II) and a crosslinking composition containing 1) 0.01 to 10 weight percent crosslinking monomer having at least two ethylenically unsaturated groups and 2) 10 to 90 weight percent monomers (10 to 89.99 weight percent) having a single ethylenically unsaturated group. In still other embodiments, the crosslinkable composition contains 10 to 60 weight percent polymeric material of Formula (II) and a crosslinking composition containing 1) 0.01 to 10 weight percent crosslinking monomer having at least two ethylenically unsaturated groups and 2) 30 to 90 weight percent (30 to 89.99 weight percent) monomers having a single ethylenically unsaturated group.

If the crosslinkable composition is to be applied to a substrate by printing or dispensing, the amount of the polymeric material of Formula (II) is often in a range of 5 to 40 weight percent based on a total weight of polymerized and polymerizable material. If the amount of the polymeric material is too low, the viscosity may be unacceptably low. Further, the amount of shrinkage upon crosslinking may be unacceptably high. If the amount of the polymeric material is too high, shrinkage upon crosslinking will be minimal but the viscosity may be unacceptably high. These crosslinkable compositions often include a crosslinking composition containing 1) 0.01 to 10 weight percent crosslinking monomer having at least two ethylenically unsaturated groups and 2) 50 to 95 weight percent (50 to 94.99 weight percent) monomers having a single ethylenically unsaturated group.

In other embodiments particularly useful for printing or dispensing, the crosslinkable composition contains 5 to 40 weight percent polymeric material of Formula (II) and a crosslinking composition containing 1) 0.01 to 5 weight percent crosslinking monomer having at least two ethylenically unsaturated groups and 2) 55 to 95 weight percent (55 to 94.99 weight percent) monomers having a single ethylenically unsaturated group. In still further embodiments, the crosslinkable composition contains 10 to 40 weight percent polymeric material of Formula (II) and a crosslinking composition containing 1) 0.01 to 5 weight percent crosslinking monomer having at least two ethylenically unsaturated groups and 2) 55 to 90 weight percent (55 to 89.99 weight percent) monomers having a single ethylenically unsaturated group. The amounts are based on a total weight of polymerized and polymerizable material.

If a chlorinated triazine crosslinking agent is used for crosslinking in place of the crosslinking monomer, the crosslinkable composition usually includes 0.01 to 10 weight percent chlorinated triazine based on a total weight of polymerized and polymerizable material. In many embodiments, the crosslinkable composition contains at least 0.02 weight percent, at least 0.05 weight percent, at least 0.1 weight percent, at least 0.5 weight percent, or at least 1 weight percent and up to 8 weight percent, up to 6 weight percent, up to 5 weight percent, up to 2 weight percent, or up to 1 weight percent chlorinated triazine crosslinking agent based on the total weight of polymerized and polymerizable material. If the crosslinked composition is a pressure-sensitive adhesive, the crosslinkable composition often contains up to 3 weight percent, up to 2 weight percent, up to 1 weight percent, or up to 0.5 weight percent of chlorinated triazine crosslinking agent.

The crosslinkable composition contains 5 to 90 weight percent polymeric material of Formula (II) and a crosslinking composition containing 1) 0.01 to 10 weight percent chlorinated triazine crosslinking agent and 2) 0 to 95 weight percent (0 to 94.99 weight percent) monomers having a single ethylenically unsaturated group. In other embodiments, the crosslinkable composition contains 10 to 90 weight percent polymeric material of Formula (II) and a crosslinking composition containing 1) 0.01 to 10 weight percent chlorinated triazine crosslinking agent and 2) 10 to 90 weight percent monomers (10 to 89.99 weight percent) having a single ethylenically unsaturated group. In still other embodiments, the crosslinkable composition contains 10 to 60 weight percent polymeric material of Formula (II) and a crosslinking composition containing 1) 0.01 to 10 weight percent chlorinated triazine crosslinking agent and 2) 30 to 90 weight percent (30 to 89.99 weight percent) monomers having a single ethylenically unsaturated group.

If the crosslinkable composition is to be applied to a substrate by printing or dispensing, the amount of the polymeric material of Formula (II) is often in a range of 5 to 40 weight percent based on a total weight of polymerized and polymerizable material. These crosslinkable compositions often include a crosslinking composition containing 1) 0.01 to 10 weight percent chlorinated triazine crosslinking agent and 2) 50 to 95 weight percent (50 to 94.99 weight percent) monomers having a single ethylenically unsaturated group. In other embodiments particularly useful for printing or dispensing, the crosslinkable composition contains 5 to 40 weight percent polymeric material of Formula (II) and a crosslinking composition containing 1) 0.01 to 5 weight percent chlorinated triazine crosslinking agent and 2) 55 to 95 weight percent (55 to 94.99 weight percent) monomers having a single ethylenically unsaturated group. In still further embodiments, the crosslinkable composition contains 10 to 40 weight percent polymeric material of Formula (II) and a crosslinking composition containing 1) 0.01 to 5 weight percent chlorinated triazine crosslinking agent and 2) 55 to 90 weight percent (55 to 89.99 weight percent) monomers having a single ethylenically unsaturated group. The amounts are based on a total weight of polymerized and polymerizable material.

If a mixture of the chlorinated triazine crosslinking agent and the crosslinking monomer is used, the crosslinkable composition often contains 0.01 to 10 weight percent of the mixture. For example, the crosslinkable composition contains 5 to 90 weight percent polymeric material of Formula (II) and a crosslinking composition containing 1) 0.01 to 10 weight percent chlorinated triazine crosslinking agent and/or crosslinking monomer having at least two ethylenically unsaturated groups and 2) 0 to 95 weight percent (0 to 94.99 weight percent) monomers having a single ethylenically unsaturated group. In other embodiments, the crosslinkable composition contains 10 to 90 weight percent polymeric material of Formula (II) and a crosslinking composition containing 1) 0.01 to 10 weight percent chlorinated triazine crosslinking agent and/or crosslinking monomer having at least two ethylenically unsaturated groups and 2) 10 to 90 weight percent monomers (10 to 89.99 weight percent) having a single ethylenically unsaturated group. In still other embodiments, the crosslinkable composition contains 10 to 60 weight percent polymeric material of Formula (II) and a crosslinking composition containing 1) 0.01 to 10 weight percent chlorinated triazine crosslinking agent and/or crosslinking monomer having at least two ethylenically unsaturated groups and 2) 30 to 90 weight percent (30 to 89.99 weight percent) monomers having a single ethylenically unsaturated group.

If the crosslinkable composition is to be applied to a substrate by printing or dispensing, the amount of the polymeric material of Formula (II) is often in a range of 5 to 40 weight percent based on a total weight of polymerized and polymerizable material. These crosslinkable compositions often include a crosslinking composition containing 1) 0.01 to 10 weight percent chlorinated triazine crosslinking agent and/or crosslinking monomer having at least two ethylenically unsaturated groups and 2) 50 to 95 weight percent (50 to 94.99 weight percent) monomers having a single ethylenically unsaturated group. In other embodiments particularly useful for printing or dispensing, the crosslinkable composition contains 5 to 40 weight percent polymeric material of Formula (II) and a crosslinking composition containing 1) 0.01 to 5 weight percent chlorinated triazine crosslinking agent and/or crosslinking monomer having at least two ethylenically unsaturated groups and 2) 55 to 95 weight percent (55 to 94.99 weight percent) monomers having a single ethylenically unsaturated group. In still further embodiments, the crosslinkable composition contains 10 to 40 weight percent polymeric material of Formula (II) and a crosslinking composition containing 1) 0.01 to 5 weight percent chlorinated triazine crosslinking agent and/or crosslinking monomer having at least two ethylenically unsaturated groups and 2) 55 to 90 weight percent (55 to 89.99 weight percent) monomers having a single ethylenically unsaturated group. The amounts are based on a total weight of polymerized and polymerizable material.

In some specific embodiments, the polymeric material of Formula (II) is selected so that the final crosslinked composition is suitable for use as a pressure-sensitive adhesive composition. Although the polymeric material included in a pressure-sensitive adhesive can have multiple polymeric blocks within the polymeric groups, the polymeric material often contains a single polymeric block.

For use as a pressure-sensitive adhesive, the monomers selected to form the polymeric material of Formula (II) are those that will result in an elastomeric material. The elastomeric material typically has a glass transition temperature (Tg) that is no greater than 20° C., no greater than 10° C., no greater than 0° C., no greater than −10° C., no greater than −20° C., no greater than −30° C., no greater than −40° C., or no greater than −50° C. The glass transition temperature can be measured using techniques such as Differential Scanning Calorimetry and Dynamic Mechanical Analysis. Alternatively, the glass transition temperature can be estimated using the Fox equation. Lists of glass transition temperatures for homopolymers are available from multiple monomer suppliers such as from BASF Corporation (Houston, Tex., USA), Polyscience, Inc. (Warrington, Pa., USA), and Aldrich (St. Louis, Mo., USA) as well as in various publications such as, for example, Mattioni et al., *J. Chem. Inf. Comput. Sci.*, 2002, 42, 232-240.

To form an elastomeric polymeric material of Formula (II), the first monomer composition often contains at least one low Tg monomer. As used herein, the term "low Tg monomer" refers to a monomer having a Tg no greater than 20° C. when homopolymerized (i.e., a homopolymer formed from the low Tg monomer has a Tg no greater than 20° C.). Suitable low Tg monomers are often selected from an alkyl (meth)acrylates, heteroalkyl (meth)acrylates, aryl substituted alkyl acrylate, and aryloxy substituted alkyl acrylates.

Example low Tg alkyl (meth)acrylate monomers often are non-tertiary alkyl acrylates but can be alkyl methacrylates having a linear alkyl group with at least 4 carbon atoms. Specific examples of alkyl (meth)acrylates include, but are not limited to, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, and n-dodecyl methacrylate. Isomers and mixture of isomers of these monomers can be used.

Example low Tg heteroalkyl (meth)acrylate monomers often have at least 3 carbon atoms, at least 4 carbon atoms, or at least 6 carbon atoms and can have up to 30 or more carbon atoms, up to 20 carbon atoms, up to 18 carbon atoms, up to 16 carbon atoms, up to 12 carbon atoms, or up to 10 carbon atoms. Specific examples of heteroalkyl (meth)acrylates include, but are not limited to, 2-ethoxyethyl acrylate, 2-(2-ethoxyethoxy)ethyl acrylate, 2-methoxyethyl (meth) acrylate, and tetrahydrofurfuryl (meth)acrylate.

Exemplary low Tg aryl substituted alkyl acrylates or aryloxy substituted alkyl acrylates include, but are not limited to, 2-biphenylhexyl acrylate, benzyl acrylate, 2-phenoxyethyl acrylate, and 2-phenylethyl acrylate.

The first monomer composition for forming a polymeric material of Formula (II) often contains at least 40 weight percent of a low Tg monomer based on a total weight of monomers in first monomer composition. In some embodiment, the first monomer composition contains at least 45 weight percent, at least 50 weight percent, at least 60 weight percent, at least 65 weight percent, at least 70 weight percent, at least 75 weight percent, or at least 80 weight percent and up to 100 weight percent, up to 99 weight percent, up to 98 weight percent, up to 95 weight percent, up to 90 weight percent, or up to 85 weight percent of the low Tg monomer.

Some first monomer compositions can include an optional polar monomer. The polar monomer has an ethylenically unsaturated group plus a polar group such as an acidic group or a salt thereof, a hydroxyl group, a primary amido group, a secondary amido group, a tertiary amido group, or an amino group. Having a polar monomer often facilitates adherence of the pressure-sensitive adhesive to a variety of substrates.

Exemplary polar monomers with an acidic group include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methyl-propanesulfonic acid, vinyl phosphonic acid, and mixtures thereof. Due to their availability, the acid monomers are often (meth)acrylic acids.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide or 3-hydroxypropyl (meth)acrylamide), ethoxylated hydroxyethyl (meth) acrylate (e.g., monomers commercially available from Sartomer (Exton, Pa., USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth) acrylamide.

Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth) acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

The amount of the optional polar monomer is often in a range of 0 to 30 weight percent based on the weight of monomers in first monomer composition. If present, the amount of polar monomer in the first monomer composition is often at least 0.1 weight percent, at least 0.5 weight percent, or at least 1 weight percent based on the total weight of monomers in first monomer composition. The amount can be up to 30 weight percent, up to 25 weight percent, up to 20 weight percent, up to 15 weight percent, up to 10 weight percent, or up to 5 weight percent. For example, the amount is often in a range of 0 to 30 weight percent, in a range of 0 to 20 weight percent, in a range of 0 to 15 weight percent, in a range of 0 to 10 weight percent, in a range of 0 to 5 weight percent, in a range of 0.5 to 15 weight percent, in a range of 1 to 15 weight percent, or in a range of 1 to 10 weight percent based on a total weight of monomers in first monomer composition.

The first monomer composition can optionally include a high Tg monomer. As used herein, the term "high Tg monomer" refers to a monomer that has a Tg greater than 30° C., greater than 40° C., or greater than 50° C. when homopolymerized (i.e., a homopolymer formed from the monomer has a Tg greater than 30° C., greater than 40° C., or greater than 50° C.). Some suitable high $T_g$ monomers have a single (meth)acryloyl group such as, for example, methyl methacrylate, ethyl methacrylate, n-propyl methacrylate, isopropyl methacrylate, n-butyl methacrylate, isobutyl methacrylate, sec-butyl methacrylate, tert-butyl (meth)acrylate, cyclohexyl methacrylate, isobornyl (meth)acrylate, stearyl (meth)acrylate, phenyl acrylate, benzyl methacrylate, 3,3,5 trimethylcyclohexyl (meth)acrylate, 2-phenoxyethyl methacrylate, N-octyl (meth)acrylamide, and mixtures thereof. Other suitable high Tg monomers have a single vinyl group that is not a (meth)acryloyl group such as, for example, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof. Vinyl monomers having a group characteristic of polar monomers are considered herein to be polar monomers.

The amount of high Tg monomer used to form the polymeric material of Formula (II) can be up to 50 weight percent or even higher provided that the Tg of the polymeric material is no greater than 20° C. In some embodiments, the amount can be up to 40 weight percent, up to 30 weight percent, up to 20 weight percent, up to 15 weight percent, or up to 10 weight percent. The amount can be at least 1 weight percent, at least 2 weight percent, or at least 5 weight percent. For example, the amount can be in a range of 0 to 50 weight percent, 0 to 40 weight percent, 0 to 30 weight percent, 0 to 20 weight percent, 0 to 10 weight percent, 1 to 30 weight percent, 1 to 20 weight percent, or 1 to 10 weight percent. The amount values are based on a total weight of monomers in first monomer composition.

Still further, the first monomer composition can optionally include a vinyl monomer (i.e., a monomer with an ethylenically unsaturated group that is not a (meth)acryloyl group). Examples of optional vinyl monomers include, but are not limited to, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof. The vinyl monomers having a group characteristic of polar monomers are considered herein to be polar monomers.

The amount of the optional vinyl monomer lacking a (meth)acryloyl group is often in a range of 0 to 15 weight percent based on the weight of monomers in first monomer composition. If present, the amount of vinyl monomers in the first monomer composition is often at least 0.1 weight percent, 0.2 weight percent, 0.5 weight percent, or 1 weight percent based on the total weight of monomers in the first monomer composition. The amount can be up to 15 weight percent, up to 10 weight percent, or up to 5 weight percent. For example, the amount is often in a range of 0 to 15 weight percent, in a range of 0.1 to 10 weight percent, in a range of 0.5 to 5 weight percent, or in a range of 1 to 5 weight percent based on a total weight of monomers in the first monomer composition.

Overall the elastomeric polymeric material of Formula (II) can be formed from a first monomer composition that includes up to 100 weight percent of the low Tg monomer. In some embodiments, the first monomer composition contains 100 weight percent low Tg monomer based on the total weight of monomers in the first monomer composition. In other embodiments, the first monomer composition contains 40 to 100 weight percent of the low Tg monomer, 0 to 30 weight percent polar monomer, 0 to 50 weight percent high Tg monomer, and 0 to 15 weight percent vinyl monomers not having a (meth)acryloyl group. In still other embodiments, the first monomer composition contains 60 to 100 weight percent of the low Tg monomer, 0 to 20 weight percent polar monomer, 0 to 40 weight percent high Tg monomer, and 0 to 10 weight percent vinyl monomers not having a (meth)acryloyl group. In yet other embodiments, the first monomer composition contains 75 to 100 weight percent of the low Tg monomer, 0 to 10 weight percent polar monomer, 0 to 25 weight percent high Tg monomer, and 0 to 5 weight percent vinyl monomers not having a (meth)acryloyl group.

The resulting elastomeric polymeric material of Formula (II) contains up to 100 weight percent or 100 weight percent low Tg monomer units. The weight percent value is based on the total weight of monomeric units in the polymeric material. In some embodiments, the polymeric material contains 40 to 100 weight percent of the low Tg monomeric units, 0 to 15 weight percent polar monomeric units, 0 to 50 weight percent high Tg monomeric units, and 0 to 15 weight percent vinyl monomeric units. In still other embodiments, the polymer contains 60 to 100 weight percent of the low Tg monomeric units, 0 to 10 weight percent polar monomeric units, 0 to 40 weight percent high Tg monomeric units, and 0 to 10 weight percent vinyl monomeric units. In yet other embodiments, the polymer contains 75 to 100 weight percent of the low Tg monomeric units, 0 to 10 weight percent polar monomeric units, 0 to 25 weight percent high Tg monomeric units, and 0 to 5 weight percent vinyl monomeric units.

The photoinitiators of Formula (I) allow the formation of polymeric materials of Formula (II) that can have a narrower distribution of molecular weights. That is, syrup polymers with a narrower distribution of molecular weights compared to conventionally prepared syrup polymers. Conventionally prepared syrup polymers often contain a small number of longer chains resulting in syrups with higher viscosities. That is, the viscosity of the syrup polymer can be more easily controlled and adjusted with polymeric materials formed using the photoinitiators of Formula (I).

The elastomeric material of Formula (II) is combined with a crosslinking composition containing a chlorinated triazine crosslinking agent and/or a crosslinking monomer having at least two ethylenically unsaturated groups. In some embodiments, the only monomer in the crosslinking composition is the crosslinking monomer. In many embodiments, however, the crosslinking composition further includes a monomer having a single ethylenically unsaturated group. The single ethylenically unsaturated monomer can be a residual monomer remaining in the syrup polymer or can be additional monomers that were not included in the monomer composition used to form the elastomeric material of Formula (II). Examples of additional monomers are any of those described above.

In addition to the polymeric material of Formula (II) (including elastomeric material of Formula (II)) and the crosslinking composition containing the chlorinated triazine crosslinking agent and/or the crosslinking monomer plus optional monomers having a single ethylenically unsaturated group, the crosslinkable composition includes a thixotropic agent. The thixotropic agent contains a metal oxide particle that is optionally treated with a surface modification agent. The thixotropic agent is added to adjust the viscosity of the crosslinkable composition. For example, the thixotropic agent is added to facilitate printing or dispensing of the crosslinkable composition.

Any metal oxide particle that functions as a thixotropic agent can be used. As used herein, a composition is thixotropic if the viscosity decreases when the composition is subjected to a shearing stress over a given time with subsequent recovery or partial recovery of viscosity when the shearing stress is decreased or removed. The advantage of the thixotropic behavior is that the composition can be dispensed or printed more easily. That is, the composition can have decreased viscosity during dispensing or printing but the viscosity can increase significantly after being dispersed or printed. The increased viscosity helps keep the printed or dispensed composition from spreading undesirably.

The selection of the thixotropic metal oxide particles is often based on the final use and performance requirements of the crosslinked composition. In some instances, the selection can be based on the desired color, light transmission, and haze of the crosslinked composition. The metal oxide particles are often silicon oxide (e.g., silica), zirconium oxide, titanium oxide, aluminum oxide, clay, boron nitride, and the like. The average diameter of the metal oxide particles is often selected so that the particles do not settle from the composition under normal gravitational forces. The average diameter is often no greater than 500 nanometers, no greater than 400 nanometers, no greater than 300 nanometers, no greater than 200 nanometers, or no greater than 100 nanometers. The average diameter is often at least 10 nanometers, at least 20 nanometers, at least 50 nanometers, or at least 100 nanometers. The average diameter can be determined using techniques such as electron microscopy based on image analysis of at least several hundred particles.

In some embodiments, the metal oxide is a silicon oxide such as, for example, fumed silica. Suitable fumed silicas include, for example, those available under the trade designation AEROSIL from Evonik Industries, under the trade designations CAB-O-SIL and CAB-O-SPERSE from Cabot Corporation, and under the trade designation HDK from Wacker Chemie AG. In other embodiments, the metal oxide is fumed aluminum oxide such as those available, for example, under the trade designation AEROXIDE from Evonik Industries. In still other embodiments, the metal oxide is clay such as those available under the trade designation GARAMITE from Southern Clay Products.

If desired, the metal oxide particles can be treated with a surface modification agent to increase compatibility with the polymerized and polymerizable composition. The surface modification agent can be hydrophobic or hydrophilic. Suitable surface modification agents are often silanes, siloxanes, carboxylic acids, phosphonic acids, and the like.

In some embodiments, the metal oxide particle is treated with a hydrophobic surface modification agent to be enhance compatibility with various alkyl (meth)acrylates and other monomers present in the crosslinkable composition or that were used to form the polymeric material of Formula (II). Suitable surface treatment agents include, for example, various silanes with at least one hydrolyzable group such as alkoxy groups and with at least one alkyl group having 1 to 20 carbon atoms. The hydrolyzable alkoxy group often has 1 to 4 carbon atoms, 1 to 3 carbon atoms, or 1 to 2 carbon atoms. There can be 1 to 3 alkoxy groups and 1 to 3 alkyl groups with the sum of the alkoxy and alkyl groups being equal to 4. Stated differently, the silane is of formula $Si(R^{30})_t(R^{31})_{4-t}$ where the variable t is equal to 1, 2, or 3 and both $R^{30}$ is an alkoxy and $R^{31}$ is an alkyl. A mixture of silanes can be used. For example, a mixture of a first silane having an alkyl group with 10 to 20 carbon atoms and a second silane having an alkyl group with 1 to 9 carbon atoms can be used. A combination of short and long chains tends to increase the overall coverage of the metal oxide particles with the hydrophobic groups.

The thixotropic agent is usually either a metal oxide particle or a surface modified metal oxide particle. Such thixotropic agents often contain 50 to 100 weight percent metal oxide particle and 0 to 50 weight percent surface treatment. In some embodiments, the thixotropic agent is at least 50 weight percent, at least 55 weight percent, at least 60 weight percent, at least 65 weight percent, at least 70 weight percent, at least 75 weight percent, at least 80 weight percent, at least 85 weight percent, at least 90 weight percent, or at least 95 weight percent metal oxide particles with the remainder being the surface treatment. The amounts are based on the total weight of the thixotropic agent.

The amount of the thixotropic agent is typically in a range of 1 to 10 weight percent based on a total weight of the polymerizable and polymerized material. If the amount is less than 1 weight percent, the crosslinkable composition may not be thixotropic and the viscosity may be too low (i.e., the composition may be too runny after being dispensed or printed). If the amount is greater than 10 weight percent, however, the viscosity may be too high. Further, the metal oxide particles may not be miscible with the other components of the crosslinkable composition and may settle out or form a particle network. The amount of the thixotropic agent is often at least 1 weight percent, at least 2 weight percent, at least 3 weight percent, or at least 5 weight percent and up to 10 weight percent, up to 8 weight percent, up to 6 weight percent, or up to 5 weight percent. The amount is based on the total weight of the polymerizable and polymerized material.

The crosslinkable composition can optionally further include a photoinitiator. The initiator can be a photoinitiator of Formula (I), a photoinitiator not of Formula (I) such as a conventionally used photoinitiator for free radical polymerization reactions, or mixtures thereof. Suitable photoinitiator compounds that are not of Formula (I) are often classified as Type I photoinitiators. Some exemplary photoinitiators not of Formula (I) are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl- 1,2-propanedione-2-(O-ethoxycarbonyl)oxime. Other suitable photoinitiators include, for example, 1-hydroxycyclohexyl phenyl ketone (commercially available under the trade designation IRGACURE 184), bis(acyl)phenyl phosphine oxides such as bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA). In some embodiments, the photoinitiator is a substituted acetophenone or a bis(acyl)phenyl phosphine oxide.

The amount of any added photoinitiator in the crosslinkable composition is often in a range of 0 to 1 weight percent based on a total weight of polymerized and polymerizable material. For example, the amount can be at least 0.01 weight percent, at least 0.02 weight percent, at least 0.05 weight percent, or at least 0.1 weight percent and can be up to 1 weight percent, up to 0.8 weight percent, up to 0.5 weight percent, or up to 0.3 weight percent.

An organic solvent can be added, if desired, to control the viscosity of the crosslinkable composition. In many embodiments, no organic solvent (i.e., the crosslinkable composition is free of organic solvent) or only a minimum amount of the organic solvent is added. The amount of organic solvent can be up to 60 weight percent or even higher based on a total weight of the crosslinkable composition. The amount of organic solvent can be up to 50 weight percent, up to 40 weight percent, up to 30 weight percent, up to 20 weight percent, up to 10 weight percent, or up to 5 weight percent. In some embodiments, it is desirable to keep the content of organic solvent as low as possible. Any organic solvent used in the second reaction mixture is typically removed at the completion of the crosslinking reaction. Suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

To form a crosslinked composition, the crosslinkable composition is often applied to a substrate and then exposed to ultraviolet radiation. Any suitable substrate can be used. Stated differently, an article is provided that includes a first substrate and a crosslinkable composition layer positioned adjacent the first substrate. The crosslinkable composition can be positioned in any desired pattern or as a continuous layer. Patterns can be regular or irregular and of any desired size, shape, or design. Any of the crosslinkable composition described above can be used.

The crosslinkable composition can be positioned adjacent to the substrate using any suitable process such as, for example, flow coating, dip coating, spray coating, knife coating, die coating, extrusion, printing, or dispensing. Once positioned adjacent to the substrate, the crosslinkable coating is exposed to ultraviolet radiation to react the crosslinking composition and form the crosslinked composition.

In some embodiments, the crosslinkable composition is printed or dispensed. The crosslinkable composition can typically be printed or dispensed onto a substrate. In many embodiments, the crosslinkable composition can be printed or dispensed into a pattern on the substrate. To be printed or dispensed, the desired viscosity of the crosslinkable composition depends on several variables such as the amount of the polymeric material of Formula (II), the weight average molecular weight of the polymeric material of Formula (II), the amount of the thixotropic agent, the amount of the crosslinking composition, and the amount of any optional organic solvent. As the molecular weight of the polymeric material of Formula (II) increases, a lower amount of the polymeric material will be needed. Further, as the weight average molecular weight of the polymeric material increases, the likelihood of undesirable stringing of the crosslinkable composition can result upon printing or dispensing. As the weight average molecular weight of the polymeric material of Formula (II) decreases, however, larger amounts can be used before the viscosity of the crosslinkable composition becomes unacceptably high.

For use in printing or dispensing applications, the crosslinkable composition often has a Trouton's ratio in a range of 3 to 25 at a rate (i.e., extensional rate) of 1000 $\sec^{-1}$. The Trouton's ratio is the extensional viscosity divided by the shear viscosity. If the Trouton's ratio is greater than 25 (i.e., if the extensional viscosity is too high relative to the shear viscosity), the crosslinkable composition has an increased tendency towards stringing upon printing or dispensing. That is, the crosslinkable composition may be too elastic in nature and stringing can result that can cause poor pattern quality or strings of crosslinkable composition landing on substrate in areas not intended. Details of measuring the extensional viscosity and the shear viscosity are in the Example section. In some embodiments, the Trouton's ratio is at least 4, at least 5, at least 6, at least 8, or at least 10 and can be up to 25, up to 22, up to 20, up to 18, up to 16, up to 15, up to 14, or up to 12. In some embodiments, the Trouton's ratio is in a range of 3 to 20, 3 to 15, 3 to 10, 5 to 25, 5 to 20, 5 to 15, 10 to 25, or 10 to 20.

Printing or dispensing the crosslinkable composition advantageously eliminates the need to die cut the crosslinked composition layer to get the desired size and shape. Die cutting can create undesirable waste because the trimmed material often need to be discarded. Additionally, some soft or compliant crosslinked composition layers may be difficult to cleanly die cut. That is, the layers may deform or flow when die cut.

The use of polymeric material of Formula (II) in the crosslinkable composition is particularly advantageous due to its active end groups (terminal groups). Upon exposure of the crosslinkable composition to ultraviolet radiation, photolysis occurs releasing the radical of formula $R^1$—(CS)—S*. Monomers in the crosslinkable composition can polymerize to form crosslinked polymeric group attached to each of the outer termini in the polymeric material of Formula (II). When exposure to ultraviolet radiation is terminated, the polymerization reaction ceases by reaction with a radical of formula $R^1$—(CS)—S*. The product is a crosslinked polymeric material.

When polymeric materials formed using conventional methods (i.e., polymeric materials that lack active $R^1$—(CS)—S— groups) are combined with a crosslinking monomer having multiple ethylenically unsaturated groups, a second polymeric material forms that is separate from the original polymeric material. The second polymeric material is crosslinked in the presence of the original polymeric material and the result is the formation of a gelled network. The original polymeric material is not involved in the crosslinking reaction and usually is not covalently attached to the second polymeric material in the gelled network.

In contrast, the polymeric material of Formula (II) has terminal $R^1$—(CS)—S— groups. When exposed to ultraviolet radiation, radicals of formula $R^1$—(CS)—S* are released and the original polymeric material undergoes chain extension and crosslinking reactions. That is, the original polymeric material itself is involved in the crosslinking reaction.

Decreasing the ratio of terminal groups of formula $R^1$—(CS)—S— to the crosslinking monomer tends to favor crosslinking. If increased branching is desired, however, the ratio of the terminal groups to crosslinking monomer can be increased. That is, the extent of crosslinking can be controlled. The terminal groups can come from the original polymeric material of Formula (II) or from a combination of the original polymeric material of Formula (II) plus added photoinitiator of Formula (I).

The crosslinkable composition can be exposed to ultraviolet radiation having a UVA maximum in a range of 280 to 425 nanometers. Ultraviolet light sources can be of various types. Low light intensity lights such as black lights, generally provide intensities ranging from 0.1 or 0.5 mW/cm² (milliWatts per square centimeter) to 10 mW/cm² (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm² ranging up to 450 mW/cm² or greater. In some embodiments, high intensity light sources provide intensities up to 500, 600, 700, 800, 900 or 1000 mW/cm². UV light to polymerize the monomer component(s) can be provided by various light sources such as light emitting diodes (LEDs), black lights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used.

In some embodiments, it is preferable to use lights that emit a narrow spectrum of light in the ultraviolet region of the electromagnetic spectrum. These light sources, which can include LEDs and lasers, can result in the formation of crosslinkable compositions without the need to add conventional photoinitiators prior to the curing process. These light sources can enhance the rate of polymerization while maintaining the reactive nature of the polymeric material.

In other embodiments, where broader wavelength ultraviolet light sources are used such as black lights, conventional photoinitiators for radical polymerization reactions may need to be added to the crosslinkable compositions prior to crosslinking.

The crosslinkable composition can be positioned on any suitable substrate to provide an article. The substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the crosslinkable composition, crosslinked composition, or both. Such treatments include, for example, application of primer layers, surface modification layer (e.g., corona treatment or surface abrasion), or both.

In some embodiments, the substrate is a release liner. Release liners typically have low affinity for the crosslinkable composition or crosslinked composition. Exemplary release liners can be prepared from paper (e.g., Kraft paper) or other types of polymeric material. Some release liners are coated with an outer layer of a release agent such as a silicone-containing material or a fluorocarbon-containing material.

The crosslinkable composition can be positioned next to a substrate using a roll-to-roll process. That is, the substrate can be moved from a first roll to a second roll in a continuous process. As the substrate moves between the first roll and the second roll, it can be coated with the crosslinkable composition. Such a substrate can be regarded as being a web and the web is often a polymeric material such as those described above. The polymeric web can be unrolled from a first roll, coated with the crosslinkable composition, exposed to ultraviolet radiation for crosslinking, and then rolled onto the second roll.

The crosslinkable composition coating can have any desired thickness that can be effectively crosslinked when exposed to ultraviolet radiation. In many embodiments, the crosslinkable composition coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the crosslinkable composition coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

While the first polymeric material of Formula (I) have dithiocarbamate or dithiocarbonate terminal groups of formula $R^1$—(CS)—S—, the final crosslinked polymeric may have these groups. Alternatively, the terminal groups can be replaced after the crosslinked polymeric material has formed using known methods such as those described, for example, in (a) Taton et al., *Handbook of RAFT Polymerization*, Barner-Kowollik, ed., Wiley-VCH: Weinheim, 2008, p. 373, (b) Destarac et al., *Polym. Prepr. (Am. Chem. Soc., Div. Polym. Chem.)*, 2008, 49(2), (c) Destarac, *Polymer Preprints*, 2008, 49(2), page 179, and (d) Tsarevsky et al., *In Controlled Radical Polymerization: Mechanisms*, ACS Symposium Series, American Chemical Society, Washington, D.C., 2015, 211-246. Suitable methods include, for example, converting the dithiocarbamate or dithiocarbonate functionality into a thiol end group through reaction with nucleophiles. The polymeric material with the thiol end group can undergo various radical reactions (e.g., radical catalyzed thiol-ene reactions and radical catalyzed thiol-yne reactions), nucleophilic reactions (e.g., thiol-ene Michael addition reactions, thiol-epoxy reactions, thiol-halide reactions, thiol-isocyanate reactions), or sulfur exchange reactions (e.g., thiol-alkanethiosulfonate reactions and thiol-pyridyl disulfide reactions). Other example methods include free-radical reductive cleavage of the dithiocarbamate or dithiocarbonate groups, oxidation with peroxide and ozone, and aminolysis using an amine or ammonia.

In some embodiments, the crosslinked composition is a pressure-sensitive adhesive. Thus, articles having a substrate and a pressure-sensitive adhesive layer adjacent to the substrate are provided. The pressure-sensitive adhesive layer can be continuous or patterned. The substrate can be selected depending on the specific application. For example, the substrate can be a sheeting material and the resulting article can provide decorative graphics or can be a reflective product. In other examples, the substrate can be label stock (the resulting article is a label with an adhesive layer), a tape backing (the resulting article is an adhesive tape), or a foam.

In yet other examples, the substrate can be a release liner and the resulting article can be an adhesive transfer tape. The adhesive transfer tape can be used to transfer the pressure-sensitive adhesive layer to another substrate or surface. Other substrates and surfaces include, for example, a panel (e.g., a metal panel such as an automotive panel) or a glass window.

For some specific adhesive transfer tapes, the crosslinkable composition is positioned adjacent to the release liner and then crosslinked under inert conditions (e.g., oxygen levels are less than 100 ppm or less than 50 ppm). If higher levels of oxygen are present, the major surface of the resulting pressure-sensitive adhesive layer opposite the release liner may not be sufficiently cured. Alternatively, if higher levels of oxygen are present, to adequately cure the major surface of the pressure-sensitive adhesive layer opposite the release liner can result in over curing of the major surface of the pressure-sensitive adhesive layer adjacent to the release liner.

Preferably, the extent of curing is relatively uniform throughout the width of the pressure-sensitive adhesive layer and the peel adhesive strength of each major surface towards a given substrate (e.g., stainless steel) varies by no more than 30 percent, no more than 20 percent, no more than 15 percent, no more than 10 percent, or no more than 5 percent. This difference can be controlled, for example, by the amount of oxygen present and the amount of crosslinking monomer and/or chlorinated triazine crosslinking agent included in the crosslinking composition.

Some articles are adhesive tapes. The adhesive tapes can be single-sided adhesive tapes with the crosslinkable composition attached to a single side of the tape backing or can be a double-sided adhesive tape with a pressure-sensitive adhesive layer on both major surfaces of the tape backing. At least one of the two pressure-sensitive adhesive layers is the crosslinkable composition described above. Double-sided adhesive tapes are often carried on a release liner.

If desired, tackifiers can be added to the crosslinkable composition used to form pressure-sensitive adhesives compositions. Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired.

Various embodiments are provided. The embodiments include crosslinkable compositions, crosslinked compositions, articles containing the crosslinkable or crosslinked compositions, methods of making the crosslinkable and crosslinked compositions, and a method of making the articles containing the crosslinked or crosslinked compositions.

Embodiment 1A is a crosslinkable composition. The crosslinkable composition includes a) a first polymeric material of Formula (II),

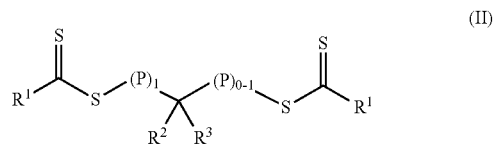

(II)

b) a crosslinking composition, and c) a thixotropic agent containing a metal oxide particle. In the first polymeric material of Formula (II), $(P)_1$ means that there is one polymeric group and $(P)_{0-1}$ means that there are 0 or 1 polymeric groups. Each polymeric group P comprises a polymerized product of a first monomer composition containing a first monomer having a single ethylenically unsaturated group. Each $R^1$ an alkoxy, aralkyloxy, alkenoxy, or $—N(R^4)_2$. Group $R^2$ is of formula $—(OR^5)_q—OR^6$ or of formula $—(CO)—X—R^7$. Group $R^3$ is hydrogen, alkyl, aryl, substituted aryl (i.e., an aryl substituted with at least one alkyl, alkoxy, or halo), alkaryl, a group of formula $—(CO)—OR^8$, or a group of formula $—(CO)—N(R^9)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group $R^{10}$ is hydrogen, alkyl, aryl, aralkyl, or alkaryl. Group X is a single bond, oxy, or $—NR^{10}$. The crosslinking composition is miscible with the polymeric material of Formula (II) and contains a chlorinated triazine crosslinking agent and/or a crosslinking monomer having at least two ethylenically unsaturated groups.

Embodiment 2A is the crosslinkable composition of embodiment 1A, wherein the weight average molecular weight of the polymeric material of Formula (II) is in a range of 5,000 Daltons to 500,000 Daltons.

Embodiment 3A is the crosslinkable composition of embodiment 1A or 2A, wherein $(P)_{0-1}$ is $(P)_1$ and the polymeric material of Formula (II) is of Formula (II-P2).

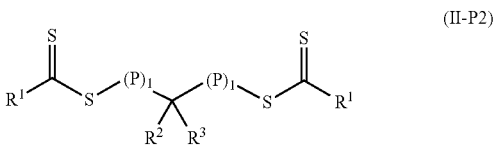

(II-P2)

Embodiment 4A is the crosslinkable composition of any one of embodiments 1A to 3A, wherein the $R^3$ is hydrogen and the polymeric material of Formula (II) is of Formula (II-1).

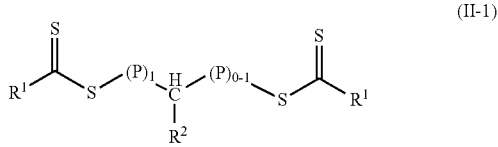

(II-1)

Embodiment 5A is the crosslinkable composition of any one of embodiments 1A to 4A, wherein there is a polymeric group on both sides of the —CHR$^2$— group and the polymeric material of Formula (II-1) is of Formula (II-1A).

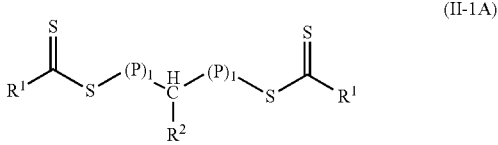

(II-1A)

Embodiment 6A is the crosslinkable composition of any one of embodiments 1A to 5A, wherein crosslinking composition comprises the crosslinking monomer having at least two ethylenically unsaturated groups.

Embodiment 7A is the crosslinkable composition of any one of embodiments 1A to 6A, wherein the crosslinkable composition comprises 5 to 90 weight percent polymeric material of Formula (II) and a crosslinking composition comprising 1) 0.01 to 20 weight percent crosslinking monomer having at least two ethylenically unsaturated groups and 2) 0 to 95 weight percent (0 to 94.99 weight percent) monomer having a single ethylenically unsaturated group, each amount being based on a total weight of polymerized material and polymerizable material.

Embodiment 8A is the crosslinkable composition of any one of embodiments 1A to 7A, wherein the crosslinkable composition comprises 5 to 40 weight percent polymeric material of Formula (II) and a crosslinking composition comprising 1) 0.01 to 10 weight percent crosslinking monomer having at least two ethylenically unsaturated groups and 2) 50 to 95 weight percent (50 to 94.99 weight percent) monomers having a single ethylenically unsaturated group.

Embodiment 9A is the crosslinkable composition of any one of embodiments 1A to 7A, wherein the crosslinkable composition comprises 5 to 40 weight percent polymeric material of Formula (II) and a crosslinking composition comprising 1) 0.01 to 5 weight percent crosslinking monomer having at least two ethylenically unsaturated groups and 2) 55 to 95 weight percent (55 to 94.99 weight percent) monomers having a single ethylenically unsaturated group.

Embodiment 10A is the crosslinkable composition of any one of embodiments 1A to 5A, wherein the crosslinking composition comprises the chlorinated triazine crosslinking agent.

Embodiment 11A is the crosslinkable composition of embodiment 10A, wherein the crosslinkable composition comprises 5 to 40 weight percent polymeric material of Formula (II) and a crosslinking composition comprising 1) 0.01 to 10 weight percent chlorinated triazine crosslinking agent and 2) 50 to 95 weight percent (50 to 94.99 weight percent) monomers having a single ethylenically unsaturated group.

Embodiment 12A is the crosslinkable composition of embodiment 10A or 11A, wherein the crosslinkable composition comprises 5 to 40 weight percent polymeric material of Formula (II) and a crosslinking composition comprising 1) 0.01 to 5 weight percent chlorinated triazine crosslinking agent and 2) 55 to 95 weight percent (55 to 94.99 weight percent) monomers having a single ethylenically unsaturated group.

Embodiment 13A is the crosslinkable composition of embodiment 1A to 5A, wherein the crosslinkable composition comprises the chlorinated triazine crosslinking agent and/or the crosslinking monomer having at least two ethylenically unsaturated groups.

Embodiment 14A is the crosslinkable composition of embodiment 13A, wherein the crosslinkable composition comprises 5 to 40 weight percent polymeric material of Formula (II) and a crosslinking composition comprising 1) 0.01 to 10 weight percent chlorinated triazine crosslinking agent and/or crosslinking monomer having at least two ethylenically unsaturated groups and 2) 50 to 95 weight percent (50 to 94.99 weight percent) monomers having a single ethylenically unsaturated group.

Embodiment 15A is the crosslinkable composition of embodiment 13A or 14A, wherein the crosslinkable composition comprises 5 to 40 weight percent polymeric material of Formula (II) and a crosslinking composition comprising 1) 0.01 to 5 weight percent chlorinated triazine crosslinking agent and/or crosslinking monomer having at least two ethylenically unsaturated groups and 2) 55 to 95 weight percent (55 to 94.99 weight percent) monomers having a single ethylenically unsaturated group.

Embodiment 16A is the crosslinkable composition of any one of embodiments 1A to 15A, wherein the first monomer composition comprises up to 100 weight percent low Tg monomer (i.e., a monomer having a Tg no greater than 20° C. when homopolymerized) based on a total weight of monomers in the first monomer composition.

Embodiment 17A is the crosslinkable composition of any one of embodiments 1A to 16A, wherein the first monomer composition 40 to 100 weight percent of the low Tg monomer, 0 to 30 weight percent polar monomer, 0 to 50 weight percent high Tg monomer (i.e., a monomer having a Tg greater than 30° C. when homopolymerized), and 0 to 15 weight percent vinyl monomers not having a (meth)acryloyl group.

Embodiment 18A is the crosslinkable composition of any one of embodiments 1A to 17A, wherein the crosslinkable composition further comprises a Type I photoinitiator.

Embodiment 19A is the crosslinkable composition of any one of embodiments 1A to 18A, wherein the thixotropic agent comprises silica particles optionally treated with a surface modifying agent.

Embodiment 20A is the crosslinkable composition of embodiment 19A, wherein the surface modifying agent is a silane compound having at least one alkoxy group and at least one alkyl group.

Embodiment 21A is the crosslinkable composition of any one of embodiments 1A to 20A, wherein the thixotropic agent is present in an amount in a range of 1 to 10 weight percent based on the total weight of polymerized material and polymerizable material.

Embodiment 22A is the crosslinkable composition of any one of embodiments 1A to 21A, wherein crosslinkable composition further comprises a tackifier.

Embodiment 23A is the crosslinkable composition of any one of embodiments 1A to 22A, wherein the crosslinkable composition has a Trouton's ratio (ratio of the extensional viscosity to shear viscosity) in a range of 3 to 25 with an extensional rate of 1000 sec$^{-1}$.

Embodiment 24A is the crosslinkable composition of any one of embodiments 1A to 23A, wherein the crosslinkable composition can be printed or dispensed.

Embodiment 1B is a crosslinked composition comprising a polymerized product of a crosslinkable composition that includes a) a first polymeric material of Formula (II),

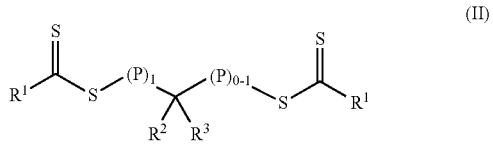

b) a crosslinking composition, and c) a thixotropic agent containing a metal oxide particle. In the first polymeric material of Formula (II), $(P)_1$ means that there is one polymeric group and $(P)_{0-1}$ means that there are 0 or 1 polymeric groups. Each polymeric group P comprises a polymerized product of a first monomer composition containing a first monomer having a single ethylenically unsaturated group. Each $R^1$ an alkoxy, aralkyloxy, alkenoxy, or $-N(R^4)_2$. Group $R^2$ is of formula $-(OR^5)_q-OR^6$ or of formula $-(CO)-X-R^7$. Group $R^3$ is hydrogen, alkyl, aryl, substituted aryl (i.e., an aryl substituted with at least one alkyl, alkoxy, or halo), alkaryl, a group of formula $-(CO)-OR^8$, or a group of formula $-(CO)-N(R^9)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group $R^{10}$ is hydrogen, alkyl, aryl, aralkyl, or alkaryl. Group X is a single bond, oxy, or $-NR^{10}-$. The crosslinking composition is miscible with the polymeric material of Formula (II) and contains a chlorinated triazine crosslinking agent and/or a crosslinking monomer having at least two ethylenically unsaturated groups.

Embodiment 2B is the crosslinked composition of embodiment 1B, wherein the crosslinkable composition is any one of embodiments 2A to 24A.

Embodiment 3B is the crosslinked composition of embodiment 1B or 2B, wherein the crosslinked composition is a pressure-sensitive adhesive.

Embodiment 1C is a method of making a crosslinkable composition. The method includes preparing a first reaction mixture that contains 1) a photoiniferter of Formula (I)

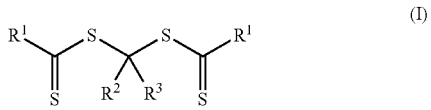

and 2) a first monomer composition comprising a first monomer having a single ethylenically unsaturated group. In Formula (I), each $R^1$ an alkoxy, aralkyloxy, alkenoxy, or $-N(R^4)_2$. Group $R^2$ is of formula $-(OR^5)_q-OR^6$ or of formula $-(CO)-X-R^7$. Group $R^3$ is hydrogen, alkyl, aryl, substituted aryl (i.e., an aryl substituted with at least one alkyl, alkoxy, or halo), alkaryl, a group of formula $-(CO)-OR^8$, or a group of formula $-(CO)-N(R^9)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group $R^{10}$ is hydrogen, alkyl, aryl, aralkyl, or alkaryl. Group X is a single bond, oxy, or $-NR^{10}-$. The method further includes exposing the first reaction mixture to actinic radiation to form a polymeric syrup containing a first polymeric material of Formula (II).

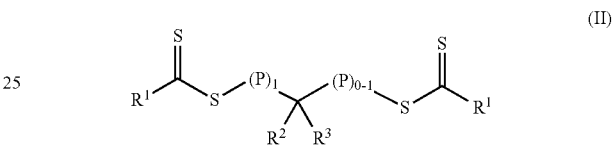

In the first polymeric material of Formula (II), $(P)_1$ means that there is one polymeric group and $(P)_{0-1}$ means that there are 0 or 1 polymeric groups. Each polymeric group P comprises a polymerized product of a first monomer composition containing a first monomer having a single ethylenically unsaturated group. The method further includes forming a crosslinkable composition containing 1) the first polymeric material of Formula (II) and 2) a crosslinking composition comprising a chlorinated triazine crosslinking agent and/or a crosslinking monomer having at least two ethylenically unsaturated groups, and 3) a thixotropic agent comprising a metal oxide particle.

Embodiment 2C is the method of embodiment 1C, wherein the crosslinkable composition is any one of embodiments 2A to 24A.

Embodiment 1D is a method of making a crosslinked composition. The method includes preparing a first reaction mixture that contains 1) a photoiniferter of Formula (I)

and 2) a first monomer composition comprising a first monomer having a single ethylenically unsaturated group. In Formula (I), each $R^1$ an alkoxy, aralkyloxy, alkenoxy, or $-N(R^4)_2$. Group $R^2$ is of formula $-(OR^5)_q-OR^6$ or of formula $-(CO)-X-R^7$. Group $R^3$ is hydrogen, alkyl, aryl, substituted aryl (i.e., an aryl substituted with at least one alkyl, alkoxy, or halo), alkaryl, a group of formula $-(CO)-OR^8$, or a group of formula $-(CO)-N(R^9)_2$. Each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Group $R^5$ is an alkylene, group $R^6$ is an alkyl, and q is an integer equal to at least 0. Group $R^7$ is hydrogen, alkyl, aryl, aralkyl, or substituted aryl (i.e., an aryl substituted with at least one alkyl, alkoxy, or halo). Group $R^8$ and $R^9$ are each independently an alkyl, aryl, aralkyl, or alkaryl. Group $R^{10}$ is hydrogen, alkyl, aryl, aralkyl, or alkaryl. Group X is a single bond, oxy, or —$NR^{10}$—. The method further includes exposing the first reaction mixture to actinic radiation to form a polymeric syrup containing a first polymeric material of Formula (II).

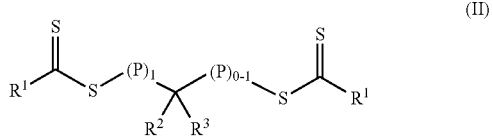

In the first polymeric material of Formula (II), $(P)_1$ means that there is one polymeric group and $(P)_{0-1}$ means that there are 0 or 1 polymeric groups. Each polymeric group P comprises a polymerized product of a first monomer composition containing a first monomer having a single ethylenically unsaturated group. The method further includes forming a crosslinkable composition containing 1) the first polymeric material of Formula (II) and 2) a crosslinking composition comprising a chlorinated triazine crosslinking agent and/or a crosslinking monomer having at least two ethylenically unsaturated groups, and 3) a thixotropic agent comprising a metal oxide particle. The method still further includes exposing the crosslinkable composition to actinic radiation to form the crosslinked composition.

Embodiment 2D is the method of embodiment 1D, wherein the crosslinkable composition is any one of embodiments 2A to 24A.

Embodiment 3D is the method of embodiment 1D or 2D, wherein the crosslinked composition is a pressure-sensitive adhesive.

Embodiment 4D is the method of any one of embodiments 1D to 3D, wherein exposing the crosslinkable composition to actinic radiation occurs under inert conditions (e.g., oxygen levels less than 100 ppm).

Embodiment 1E is a first article that includes 1) a substrate and 2) a crosslinkable composition positioned adjacent to the substrate. The crosslinkable composition is the same as described in Embodiment 1A.

Embodiment 2E if the first article of embodiment 1E, wherein the crosslinkable composition is any one of embodiments 2A to 24A.

Embodiment 3E is the first article of embodiment 1E or 2E, wherein the substrate is release liner, polymeric film, or polymeric foam.

Embodiment 4E is the first article of any one of embodiments 1E to 3E, wherein the crosslinkable composition is positioned in the form of a pattern on the substrate.

Embodiment 1F is a second article that includes 1) a substrate and 2) a crosslinked composition positioned adjacent to the substrate. The crosslinked composition is the same as described in Embodiment 1B.

Embodiment 2F is the second article of embodiment 1F, wherein the crosslinked composition is of embodiment 2B or 3B.

Embodiment 3F is the second article of embodiment 1F or 2F, wherein the crosslinked composition is a pressure-sensitive adhesive layer and the substrate is a release liner.

Embodiment 4F is the second article of any one of embodiments 1F to 3F, wherein the second article is a transfer tape.

Embodiment 5F is the second article of embodiment 3F or 4F, wherein the pressure-sensitive adhesive layer has a first major surface adjacent to the release liner and a second major surface opposite the release liner and wherein the first major surface has a first peel strength and the second major surface has a second peel strength and wherein a difference between the first peel strength and the second peel strength is no greater than 30 percent.

Embodiment 1G is a method of making the first article of Embodiment 1E. The method includes providing a substrate and applying a crosslinkable composition adjacent to the substrate to form a first article. The crosslinkable composition is the same as described in Embodiment 1A.

Embodiment 2G is the method of embodiment 1G, wherein the crosslinkable composition is any one of embodiment 2A to 24A.

Embodiment 3G is the method of embodiment 1G or 2G, wherein applying the crosslinkable composition comprising printing or dispending the crosslinkable composition.

Embodiment 4G is the method of any one of embodiments 1G to 3G, wherein applying the crosslinkable composition comprises printing the crosslinkable composition in the form of a pattern on the substrate.

Embodiment 5G is the method of any one of embodiments 1G to 4G, wherein the substrate is release liner, polymeric film, or polymeric foam.

Embodiment 1H is a method of making the second article of Embodiment 1F. The method includes providing a substrate and applying a crosslinkable composition adjacent to the substrate to form a first article. The crosslinkable composition is the same as described in Embodiment 1A. The method further includes exposing the crosslinkable composition to actinic radiation to form the crosslinked composition adjacent to the substrate.

Embodiment 2H is the method of embodiment 1H, wherein the crosslinkable composition is any one of embodiments 2A to 24A.

Embodiment 3H is the method of embodiment 1H or 2H, wherein the crosslinked composition is a pressure-sensitive adhesive.

Embodiment 4H is the method of any one of embodiments 1H to 3H, wherein exposing the crosslinkable composition to actinic radiation occurs under inert conditions (e.g., oxygen levels less than 100 ppm).

Embodiment 5H is the method of any one of embodiments 1H to 4H, wherein the substrate is release liner, polymeric film, or polymeric foam.

EXAMPLES

Unless otherwise noted, all parts, percentages, ratios, etc. in the Examples and the rest of the specification are by weight.

Materials Used in the Examples

| DESIGNATION | DESCRIPTION |
|---|---|
| IOA | Isooctyl acrylate, from 3M Company, St. Paul, MN, USA |
| 2-OA | 2-octyl acrylate, available from Monomer-Polymer and Dajac Labs, Trevose, PA, USA |

-continued

| DESIGNATION | DESCRIPTION |
|---|---|
| XL-330 | 2-(4-methoxyphenyl)-4,6-bis(trichloromethyl)-1,3,5-triazine, available from TCI America, Portland, OR, USA |
| AA 1 | Acrylic acid, 90% pure, from Alfa Aesar, Tewksbury, MA, USA |
| AA 2 | Acrylic acid, greater than 99% purity, from TCI America, Portland, OR, USA |
| I651 | 2,2-dimethoxy-1,2-diphenylethan-1-one, available as IRGACURE 651 from Ciba Specialty Chemicals, Tarrytown, NY, USA |
| Methyl dichloroacetate | Methyl dichloroacetate from Sigma Aldrich Corporation, St. Louis, MO, USA |
| Potassium isopropyl xanthate | Potassium isopropyl xanthate, from TCI America, Portland, OR, USA |
| HDDA | 1,6-hexanediol diacrylate, from Alfa Aesar, Tewksbury, MA, USA |
| Hexadecyl-trimethoxysilane | Hexadecyltrimethoxysilane having purity of 95%, a melting point of −1° C., a boiling point of 155° C. at 0.2 mm Hg (27 Pa), and a molecular weight of 347 g/mol, available as product code SIH5925.0 from Gelest, Incorporated, Morrisville, PA, USA |
| Methyl-trimethoxysilane | Methyltrimethoxysilane having purity of 96%, a melting point of −78° C., a boiling point of 102° C., and a molecular weight of 136 g/mol, available as product code SIM6560.0 from Gelest, Incorporated |
| CABOSPERSE | A medium area fumed silica dispersion having a pH of 9.8 and a solids content of 17%, available as CAB-O-SPERSE 2017A from Cabot Corporation, Billerica, MA, USA |
| PET Film | Polyester film having a thickness of 51 micrometers (0.002 inches) and being primed on one side, available as HOSTAPHAN 3SAB from Mitsubishi Polyester Film Incorporated, Greer, SC, USA |
| Release Liner Film | Release liner film having a thickness of 51 micrometers (0.002 inches), available as T10 from Solvay, Houston, TX, USA |

Test Methods
Percent Conversion to Polymer Syrup

The percent conversion of the monomers to polymer was determined gravimetrically by weighing a sample of the syrup polymer (about 1 g), drying the sample at 50° C. overnight in a vacuum oven, and then weighing the dried sample. The percent conversion was calculated as: (Final mass/initial mass)×100.

Rotational Shear Viscosity

Steady state shear viscosity was measured by rotational shear rheometry using a Model HR-2 Discovery Hybrid Rheometer (TA Instruments, New Castle, Del., USA) equipped with a DIN concentric cylinder geometry (inside diameter: 28 mm; outside diameter: 30 mm). The temperature was maintained at 23° C. using a water-cooled Peltier cup situated around the outer cylinder. Samples were subject to a pre-shear at 1 $sec^{-1}$ for 30 seconds, and then allowed to equilibrate at rest for 30 seconds. Steady state shear viscosity was measured over a range of shear rates from 0.01 $sec^{-1}$ to 1000 $sec^{-1}$. Steady state was defined as the viscosity averaged over 5 seconds following 30 seconds of rotation at the desired rate.

Capillary Rheometry for Trouton's Ratio Measurements

Capillary rheometry was used for measurements of shear viscosity at rates up to 20000 sec, and for measurements of the steady-state extensional viscosity based on contraction flow through an orifice. A Rosand RH-7 twin-bore capillary rheometer (Malvern Instruments Ltd, Malvern, Worcestershire, United Kingdom) was used with a 30-mm length, 1-mm diameter, and 90° entrance angle die in the first bore and a 1-mm diameter, 90° entrance angle orifice in the second bore. Pressure drop was recorded independently across each die. A Bagley correction was applied to account for entrance pressure effects. A Rabinowitz correction was applied to account for shear thinning effects, which tend to result in true shear rates which are greater than the shear rate predicted for a Newtonian fluid. Extensional rate and extensional viscosity were determined according to Cogswell's analysis, using the entrance pressures determined by the Bagley correction. Cogswell's analysis is described in greater detail in the article "Converging Flow of Polymer Melts in Extrusion Dies" (F. N. Cogswell, *Polymer Engineering and Science*, January 1972, 12, pp. 64-73). Trouton's Ratio is typically defined as the ratio of extensional viscosity to shear viscosity at the same rate.

Molecular Weight Determination of Syrup Polymers

Molecular weights of the syrup polymers were determined, after reacting the polymers with diazomethane, by Gel Permeation Chromatography (GPC) using an Agilent 1100 HPLC system from Agilent Technologies, Santa Clara, Calif., USA) equipped with columns: 2× Waters STYRA-GEL HR 5E, 300 mm length×7.8 mm I.D. and Waters STYRAGEL column guard (Waters Corp., Milford, Mass., USA). The system employed a Wyatt DAWN HELEOS-II 18 angle Light Scattering detector, a Wyatt Optilab T-rEX Differential Refractive Index detector, and ASTRA 6 Software for data analysis from Wyatt Technology Corporation. Tetrahydrofuran was used as the eluent and was stabilized with 250 ppm butylated hydroxytoluene (OMNISOLV, Millipore Sigma, Burlington, Mass., USA). Injection volume was 60 µL with flow rate of 1 mL/min and column oven temperature of 40° C.

Polymers were first dried in aluminum pans by heating on a hot plate at 100° C. for 1 hour and then in a vacuum oven at 50° C. overnight. A solution of diazomethane in diethyl ether was prepared using a Diazald kit from Sigma-Aldrich, St. Louis, Mo., USA, and stored in the freezer until it is used. The dried solid polymer was dissolved in THF at 3 mg/mL, filtered, and then 1 mL aliquots were methylated by adding 0.3 mL of the diazomethane solution and allowing them to stand for at least 15 minutes, before sealing the vial and analyzing by GPC.

Peel Adhesion Strength

Peel adhesion strength was measured at 74° F. (23° C.) and 50% relative humidity (RH) using an IMASS Model 2000 Slip/Peel Tester (Instrumentors Incorporated, Strongsville, Ohio). A glass substrate was cleaned by wiping it with isopropanol and a Kimwipes tissue (Kimberly-Clark, Irving, Tex., USA) followed by wiping it dry with another Kimwipes tissue. A tape test specimen measuring 0.5 inch (1.27 cm) wide by approximately 3 inches (15 cm) long was applied to the cleaned glass substrate. A 2-kilogram rubber roller was rolled over the length of the test specimen two times in each direction to ensure intimate contact with the substrate surface. The free end of the tape test specimen was doubled back at an angle of 180 degrees and attached to the testing arm. The substrate was attached to the moveable platen on the instrument. The peel test was run at a constant rate of 12 inches/minute (30.5 cm/min) for 5 seconds and the peel force was obtained by averaging the last four seconds of data. The average peel force for the test specimen was recorded in ounces/0.5 inch (0.278 N/0.13 dm). At least three test specimens were evaluated for each tape sample and the results used to obtain an average peel adhesion strength value in ounces/inch (0.278 N/0.25 dm).

The tape samples from examples E7 through E9 were tested in the same manner as described above but a stainless steel substrate was used. The adhesive surface was laminated to a 51 micrometers (0.002 inches) thick polyester film to give a single coated, polyester backed tape for testing. Tape test specimen measuring 1.0 inch (2.54 centimeters) wide by approximately 3 inches (15.2 centimeters) long was applied to the cleaned steel substrate. The prepared samples were dwelled at 23° C. and 50 percent relative humidity (RH) for 15 minutes before testing.

Shear Adhesion Strength

Shear adhesion strengths were measured at room temperature (between 20° C. and 25° C.) as follows. Stainless steel (SS) panels were cleaned by wiping them three times using methyl ethyl ketone and a Kimwipes tissue. Adhesive coated PET Film samples, (hereafter referred to as tape samples) measuring 0.5 inch (1.27 cm) wide and between 2.5 and 3 inches (6.3 and 7.6 cm) long were cut, then centered on the cleaned panels and adhered to one end such that tape overlapped the panel by 0.5 inch (1.27 cm) in the lengthwise direction. The tape sample was then rolled down two times in each direction using a 4.5-pound (2-kg) rubber roller. The tape/test panel assembly was suspended in a stand and tilted at an angle of 2° from vertical to ensure a shear force. A one-kilogram weight was hung from the free end of the tape sample. The time, in minutes, for the tape to fall from the panel was recorded. The test was terminated if failure had not occurred in 10000 minutes and the result recorded as "10000+". Three test assemblies were run for each tape construction and the average value in minutes was reported.

Preparation of Sodium Isopropyl Xanthate (SIX)

Isopropanol, 871.1 g (14.49 mol), in a flask equipped with a mechanical stirrer, was purged with nitrogen. Sodium metal cubes (20.25 g, 0.88 mol) were cut into small pieces and added to the flask over a period of three hours. The temperature was then increased to 65° C. The sodium dissolved with evolution of hydrogen over three additional hours resulting in a clear solution. The mixture was then cooled to 35° C. using an ice bath, to provide a thick slurry. Carbon disulfide (73.80 g, 0.97 mol) was added slowly over 30 minutes to the slurry followed by stirring for an additional 30 minutes to give a yellow solution. Solvent removal under vacuum gave a yellow solid which was further dried under high vacuum (1 mm Hg, 133 Pa) for four hours. A yellow powder (136.7 g), sodium isopropyl xanthate, was obtained.

Preparation of Methyl-2,2-bis(isopropoxycarbothioylsulfanyl)acetate (PI 1)

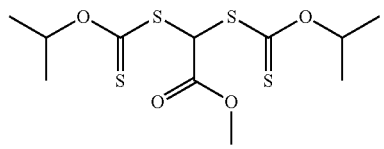 [SMILES: COC(=O)C(SC(=S)OC(C)C)SC(=S)OC(C)C]

A solution of methyl dichloroacetate (7.15 g, 50.0 mmol) dissolved in 250 mL of acetone was treated with potassium isopropyl xanthate (17.5 g, 100 mmol) and the reaction mixture was stirred overnight at room temperature. The reaction mixture was then filtered through a plug of silica gel in a small pipette, washed once with acetone, and the filtrate was concentrated down using a rotary evaporator to give a brown syrup. Purification by column chromatography (silica column using an eluent gradient of 18:82 (v:v)/methylene chloride:hexanes to 50:50 (v:v)/methylene chloride: hexanes) gave 11.5 g of methyl-2, 2-bis(isopropoxycarbothioylsulfanyl) acetate, designated herein as PI 1, as an amber colored syrup. $^1$H NMR (CDCl3, 500 MHz): δ 6.03 (s, 1H), 5.73 (m, 2H), 3.82 (s, 3H), 1.42 (d, J=6.3 Hz, 6H), 1.40 (d, J=6.3, 6H).

Preparation of 1,1-bis(isopropoxycarbothioylsulfanyl)methyl Methyl Ether (PI 2)

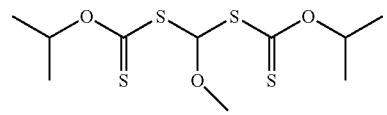 [SMILES: COC(SC(=S)OC(C)C)SC(=S)OC(C)C]

A mixture of SIX (7.57 g, 48 mmol) and acetone (30 mL) was cooled using an ice bath. A solution of dichloromethyl methyl ether (2.50 g, 22 mmol, TCI America, Portland, Oreg., USA) in acetone (5 mL) was added slowly over 15 minutes. After stirring at room temperature for three hours, the solvent was removed under vacuum. Ethyl acetate (30 mL) was added and the mixture was washed with water two times. The organic phase was concentrated under vacuum and the residual oil was purified by column chromatography over silica gel (1 to 15% ethyl acetate in hexanes). A yellow oil was isolated (5.82 g).

Preparation of 1,1-bis(isopropoxycarbothioylsulfanyl)-2-propanone (PI 3)

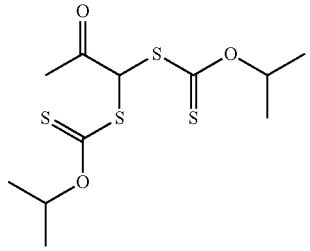 [SMILES: CC(=O)C(SC(=S)OC(C)C)SC(=S)OC(C)C]

A mixture of sodium isopropyl xanthate (6.86 g, 43 mmol) and acetone (40 mL) was cooled using an ice bath. A solution of 1,1-dichloropropan-2-one (2.50 g, 20 mmol, Alfa Aesar) in acetone (5 mL) was added slowly over 5 minutes. After stirring at room temperature for 3 hours, the solvent was removed under vacuum. Ethyl acetate (30 mL) was added and the mixture was washed with water two times. The organic phase was concentrated under vacuum and the residual oil was purified by column chromatography over silica gel (1 to 10% ethyl acetate in hexanes). A yellow oil was isolated (4.73 g).

Preparation of Octyl 2,2-bis(diethylcarbamothioylsulfanyl)acetate (PI 4)

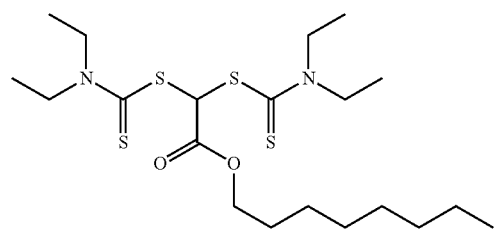 [SMILES: CCCCCCCCOC(=O)C(SC(=S)N(CC)CC)SC(=S)N(CC)CC]

A stirred solution of 1-octanol (3.00 g, 23.0 mmol, available from Sigma-Aldrich) in 50 mL of $CH_2Cl_2$ was cooled to 0° C. under nitrogen. To the solution were added triethylamine (4.80 mL, 34.4 mmol, EMD Millipore, Burlington, Mass., USA) and dimethylaminopyridine (20 mg, Alfa Aesar, Tewksbury, Mass., USA) followed by the dropwise addition of dichloroacetyl chloride (3.74 g, 25.4 mmol, Alfa Aesar). The reaction mixture was allowed to reach ambient temperature while stirring overnight. The reaction mixture was quenched with a saturated solution of $NaHCO_3$ followed by addition of 50 mL of $CH_2Cl_2$. The layers were separated and the organic portion was washed with 5% $NaH_2PO_4$ (2×) followed by brine. The organic portion was dried over $Na_2SO_4$, filtered through a small plug of silica gel, and concentrated under reduced pressure to give 4.79 g of octyl dichloroacetate as a yellow liquid.

The 1-octyl-2,2-dichloroacetate (4.79 g, 19.6 mmol) was dissolved in 50 mL of acetone and treated with sodium diethyldithiocarbamate trihydrate (8.95 g, 39.7 mmol, available from Sigma-Aldrich) and the mixture was stirred overnight. The reaction mixture was filtered, rinsing with acetone, and the filtrate was concentrated to give a dark brown oil. The oil was taken up in 100 mL of $CH_2Cl_2$ and washed with brine. The organic layer was dried over $Na_2SO_4$, filtered and concentrated under reduced pressure to give a brown syrup. Chromatography ($SiO_2$, eluting with a gradient of 25% $CH_2Cl_2$/hexanes to 100% $CH_2Cl_2$) gave 6.46 g of the title compound as a yellow syrup. $^1H$ NMR ($CDCl_3$, 500 MHz) d 7.16 (s, 1H), 4.18 (t, J=6.6 Hz, 2H), 3.98 (m, 4H), 3.72 (quartet, J=7.2 Hz, 4H), 1.66 (m, 2H), 1.36-1.25 (m, 10H), 1.31 (t, J=7.1 Hz, 6H), 1.26 (t, J=7.0, 6H), 0.89-0.86 (t, J=6.9 Hz, 3H).

Preparation of Dispersion of Surface Modified Silica Particles in IOA

CABOSPERSE, 700.11 g, was weighed into a 3-neck round bottom flask equipped with a condenser and overhead stirrer. A solution containing 704.9 g of isopropanol and 30.34 g of a mixture of hexadecyltrimethoxysilane and methyltrimethoxysilane/90:10 (w:w) was then slowly added to the flask with stirring at room temperature. The resulting solution was heated to 85° C. in a temperature controlled oil bath and allowed to react for 16 hours, then allowed to cool to room temperature. Next, the reaction mixture was solvent exchanged into IOA monomer, and then filtered through a 50 micrometer glass fiber filter and stored in a glass bottle for further use. The resulting dispersion of surface modified particles in IOA had a solids content of 23.9 weight % and an $SiO_2$ content of 19.1 weight % as determined by thermogravimetric analysis.

Preparation of Surface Modified Silica Particles (Dry Powder)

CAB-O-SPERSE 2017A (Cabot Corporation, Alpharetta, Ga.), 1100.0 g, was weighed into a 3000-mL 3-neck round-bottom flask equipped with a condenser and overhead stirrer. A solution containing 1239.1 g of isopropanol and 48.74 g of a mixture of hexadecyltrimethoxysilane and methyltrimethoxysilane/90:10 (w:w) was then slowly added to the flask with stirring at room temperature. The resulting solution was heated to 85° C. in a temperature controlled oil bath and allowed to stir and react for 16 hours, then allowed to cool to room temperature. Next, solvent was removed from 1500 g of the reaction mixture via rotary evaporator. The resulting white powder was transferred from 2000-mL flask into an aluminum pan and further dried in an oven at 110° C. for 2 hours. The product was allowed to cool to room temperature and 120 g of dried product was collected and stored in a 16-oz (473-mL) glass jar for further use.

Preparation of Printable, Crosslinkable Polymer Syrups

To a 32-ounce (0.95-L) glass jar were added various amounts of IOA, AA 1 or AA 2, photoiniferters (PI 1, PI 2, PI 3, PI 4), surface-modified silica particles dispersion (in monomers or dry, where applicable), photoinitiator (1651, pre-add, where applicable), and HDDA (pre-add, where applicable) as reported in Tables 1A and 1B, wherein for syrups S1 through S4 and S8 through S15 AA 1 was used and for syrups S5-S7 AA 2 was used. These mixtures were vigorously combined using a stainless steel mechanical stirrer at 300 rpm and degassed with a stream of nitrogen for 5 minutes (S1 through S9) or 10 minutes (S10 through S15). Next, with stirring, the contents of the flask were exposed to UV irradiation (365 nm wavelength) using a 365 nanometer LED array (1.0 mW/cm$^2$) at a distance of about 7.0 cm from the reaction jars. The total energy provided during syruping (polymerization) step at given radiant power (in milliWatts/square centimeter) for predetermined times is reported in Table 1 to give polymer syrup precursor compositions. The percent conversion (in weight percent) of the monomers to polymer syrup precursor was determined as described in the test methods and is also reported in Tables 1A and 1B, below.

TABLE 1A

| Syrup | Surface Modified Silica Particles Dispersed in IOA, g | IOA, g | 2-OA | AA, g | HDDA PRE-ADD, g | PI 1, g | PI 2, g | PI 3, g | PI 4, g | I651 PRE-ADD, g |
|---|---|---|---|---|---|---|---|---|---|---|
| S1  | —     | 313 | —   | 35.0 | —     | 0.209 | —     | —     | —     | —     |
| S2  | 74.26 | 256 | —   | 35.2 | —     | 0.217 | —     | —     | —     | —     |
| S3  | 74.30 | 255 | —   | 35.2 | 0.350 | 0.212 | —     | —     | —     | —     |
| S4  | 74.31 | 256 | —   | 35.2 | 0.699 | 0.212 | —     | —     | —     | —     |
| S5  | 74.28 | 241 | —   | 39.0 | —     | 0.210 | —     | —     | —     | —     |
| S6  | 74.28 | 241 | —   | 39.0 | —     | 0.207 | —     | —     | —     | —     |
| S7  | 74.27 | 241 | —   | 39.0 | —     | 0.207 | —     | —     | —     | —     |
| S8  | 74.28 | 255 | —   | 35   | —     | 0.210 | —     | —     | —     | —     |
| S9  | 74.28 | 255 | —   | 35   | 0.701 | 0.220 | —     | —     | —     | —     |
| S10 | —     | 315 | —   | 35   | —     | —     | —     | —     | —     | 0.140 |
| S11 | —     | 315 | —   | 35   | —     | 0.211 | —     | —     | —     | —     |
| S12 | —     | —   | 315 | 35   | —     | 0.208 | —     | —     | —     | —     |
| S13 | —     | 315 | —   | 35   | —     | —     | 0.193 | —     | —     | —     |
| S14 | —     | 315 | —   | 35   | —     | —     | —     | 0.205 | —     | —     |
| S15 | —     | 315 | —   | 35   | —     | —     | —     | —     | 0.864 | —     |

TABLE 1B

| Syrup | Reaction time, sec | Radiant Power mW/cm² | Total Light Energy J/cm² | Percent Conversion to Polymer Syrup | Weight Average Molecular Weight by GPC, kiloDaltons | Polydispersity Index (PDI) |
|---|---|---|---|---|---|---|
| S1 | 270 | 1.0 | 0.270 | 20 | — | — |
| S2 | 300 | 1.0 | 0.300 | 23 | — | — |
| S3 | 300 | 1.0 | 0.300 | 23 | — | — |
| S4 | 300 | 1.0 | 0.300 | 23 | — | — |
| S5 | 270 | 1.0 | 0.270 | 22 | — | — |
| S6 | 300 | 1.0 | 0.300 | 25 | — | — |
| S7 | 330 | 1.0 | 0.330 | 28 | — | — |
| S8 | 300 | 1.0 | 0.300 | — | — | — |
| S9 | 300 | 1.0 | 0.300 | — | — | — |
| S10 | 36 | 0.35 | 0.013 | 7 | 2,846 | 1.16 |
| S11 | 300 | 1.0 | 0.300 | 23 | 336.5 | 1.58 |
| S12 | 300 | 1.0 | 0.300 | 23 | 307.9 | 1.61 |
| S13 | 156 | 1.0 | 0.156 | 24 | 374.8 | 1.47 |
| S14 | 300 | 1.0 | 0.300 | 23 | 335.1 | 1.43 |
| S15 | 900 | 1.0 | 0.900 | 14.2 | 303.3 | 1.54 |

As reported in Tables 2A and 2B, to the polymer syrup precursors thus obtained were then added 1651 and more HDDA (Post-add, where applicable) with mixing using a mechanical stirrer at 300 rpm for one hour to give the final printable polymer syrup compositions. For Examples 7-9, the mixing time was 45 mins. Examples E10 to E15 and CE-B were prepared by placing all the components in white mixing cups and then mixing them at 3500 rpm for 5 minutes in a FlackTek SpeedMixer high shear mixer (Flack-Tek Inc., Landrum, S.C., USA).

TABLE 2A

| Example | S1, g | S2, g | S3, g | S4, g | S5, g | S6, g | S7, g | S8, g | S9, g | HDDA Post-add, g | 1651 Post-add, g |
|---|---|---|---|---|---|---|---|---|---|---|---|
| CE-A | 348.2 | — | — | — | — | — | — | — | — | 0.70 | 0.21 |
| E1 | — | 365.7 | — | — | — | — | — | — | — | 0.70 | 0.21 |
| E2 | — | — | 365.1 | — | — | — | — | — | — | 0.35 | 0.21 |
| E3 | — | — | — | 366.4 | — | — | — | — | — | — | 0.21 |
| E4 | — | — | — | — | 354.5 | — | — | — | — | 0.72 | 0.21 |
| E5 | — | — | — | — | — | 354.5 | — | — | — | 0.71 | 0.21 |
| E6 | — | — | — | — | — | — | 354.5 | — | — | 0.70 | 0.21 |
| E7 | — | — | — | — | — | — | — | 180 | — | 0.36 | 0.11 |
| E8 | — | — | — | — | — | — | — | — | 180 | — | 0.11 |
| E9 | — | — | — | — | — | — | — | — | 180 | 0.70 | 0.11 |

TABLE 2B

| Example | S10, g | S11, g | S12, g | S13, g | S14, g | S15, g | Surface Modified Silica Particles (Dry powder), g | HDDA Post-add, g | 1651 Post-add, g | XL-330, g |
|---|---|---|---|---|---|---|---|---|---|---|
| CE-B | 47.5 | — | — | — | — | — | 2.5 | 0.11 | 0.08 | — |
| E10 | — | 47.5 | — | — | — | — | 2.5 | 0.11 | 0.03 | — |
| E11 | — | 47.5 | — | — | — | — | 2.5 | 0.11 | 0.03 | 0.10 |
| E12 | — | — | 47.5 | — | — | — | 2.5 | 0.11 | 0.03 | — |
| E13 | — | — | — | 47.5 | — | — | 2.5 | 0.11 | 0.03 | — |
| E14 | — | — | — | — | 47.5 | — | 2.5 | 0.11 | 0.03 | — |
| E15 | — | — | — | — | — | 47.5 | 2.5 | 0.11 | 0.03 | — |

The final printable, crosslinkable polymer syrup compositions were evaluated for their rotational shear viscosities and Trouton ratios as described in the test methods (where applicable). The results are reported in Table 3 and Table 4, respectively.

TABLE 3

| Shear Rate, sec⁻¹ | Rotational Shear Viscosity (Pa·s) |||||||||||||||
| | CE-A | E1 | E2 | E3 | E4 | E5 | E6 | E7 | E8 | E9 | CE-B | E10 | E10 | E12 | E13 | E14 | E15 |
|---|---|---|---|---|---|---|---|---|---|---|---|---|---|---|---|---|---|
| 0.01 | 0.25 | 83.02 | 91.23 | 86.84 | 85.80 | 99.07 | 137.89 | — | — | — | 11.33 | 54.54 | 65.71 | 56.12 | 67.73 | 61.84 | 31.56 |
| 0.1 | 0.21 | 12.48 | 13.89 | 13.57 | 12.74 | 16.18 | 24.22 | — | — | — | 9.73 | 11.19 | 12.57 | 11.87 | 14.39 | 11.73 | 4.93 |

TABLE 3-continued

| Shear Rate, | Rotational Shear Viscosity (Pa·s) | | | | | | | | | | | | | | | |
|---|---|---|---|---|---|---|---|---|---|---|---|---|---|---|---|---|
| sec$^{-1}$ | CE-A | E1 | E2 | E3 | E4 | E5 | E6 | E7 | E8 | E9 | CE-B | E10 | E10 | E12 | E13 | E14 | E15 |
| 1 | 0.21 | 2.26 | 2.58 | 2.60 | 2.24 | 3.12 | 5.17 | — | — | — | 6.22 | 2.66 | 2.86 | 2.90 | 3.56 | 2.62 | 0.89 |
| 10 | 0.21 | 0.67 | 0.80 | 0.84 | 0.67 | 1.04 | 1.96 | — | — | — | 3.37 | 1.15 | 1.19 | 1.28 | 1.60 | 1.07 | 0.29 |
| 100 | 0.21 | 0.34 | 0.42 | 0.45 | 0.33 | 0.57 | 1.17 | — | — | — | 1.07 | 0.76 | 0.76 | 0.85 | 1.07 | 0.67 | 0.16 |
| 1000 | 0.20 | 0.23 | 0.28 | 0.31 | 0.23 | 0.39 | 0.74 | — | — | — | 0.24 | 0.52 | 0.52 | 0.57 | 0.69 | 0.47 | 0.12 |

TABLE 4

| Example | Trouton's Ratio at 1000 sec$^{-1}$ |
|---|---|
| CE-A | 8 |
| E1 | 16 |
| E2 | 25 |
| E3 | 16 |
| E4 | 17 |
| E5 | 12 |
| E6 | 10 |
| E7 | — |
| E8 | — |
| E9 | — |
| S10 | 40 |
| S11 | 13 |
| S12 | 11 |
| S13 | 11 |
| S14 | 13 |
| S15 | 14 |

Preparation of Adhesive Tapes

The resulting printable, crosslinkable polymer syrup compositions were then coated between the primed side of PET Film and the release side a Release Liner Film using a knife over bed coating station and a gap setting of 0.05 mm greater than the combined thickness of the two films (or greater than the single layer of Polyester release liner as in Examples E7 through E9). The coated, three-layered article was then exposed to UV irradiation for ten minutes using an array of fluorescent bulbs (350 Blacklight, F40/350BL/ECO 40 Watts) from both the top and bottom sides to provide a total energy of 3400 mJ/cm$^2$. A POWER PUCK RADIOMETER (from EIT Incorporated, Sterling, Va.) was used to determine the radiant power, which was then used to calculate total energy of exposure. Examples 7-9 were irradiated using LED lights (12 inches long unit, with peak emission of 365 nm, available from Air Motions Systems (AMS), Inc., River Falls, Wis., USA) emitting at 365 nm with 11.5 W/cm$^2$ on a moving web with a speed of 4 ft/min (1.2 m/min) after securing the adhesive coated release liner on stainless steel carrier. A crosslinked, pressure-sensitive adhesive tape construction having a crosslinked, pressure-sensitive adhesive adhered to a PET Film backing on one side and having a Release Liner Film on its opposite side was thereby obtained (except for E7, E8 and E9). Examples E7 through E9 were coated on polyester release liner which is a polyester film with release treatment and cured them under LED lights while they were under constant flow of nitrogen gas. The side, which was directly exposed to the nitrogen gas and was closer to the LED lights are designated as the Front Side (FS). These tape constructions were evaluated for their peel adhesion and shear strengths, as described in the test methods, after removal of the release liner films. Results are reported in Table 5, below.

TABLE 5

| Example | Front Side Adhesion Strength, oz/inch (N/dm) | Back Side Adhesion Strength, oz/inch (N/dm) | Shear Adhesion Strength, minutes |
|---|---|---|---|
| CE-A | 52.3 (5.68) | — | 10000+ |
| E1 | 52.2 (5.67) | — | 10000+ |
| E2 | 48.9 (5.31) | — | 10000+ |
| E3 | 49.9 (5.42) | — | 10000+ |
| E4 | 65.6 (7.12) | — | 10000+ |
| E5 | 67.6 (7.34) | — | 10000+ |
| E6 | 67.2 (7.30) | — | 10000+ |
| E7 | 50.0 (5.43) | 32 (2.26) | — |
| E8 | 50.0 (5.43) | 36 (2.54) | — |
| E9 | 27.0 (2.93) | 11 (0.78) | — |
| CE-B | 50.8 (5.52) | — | 3000+ |
| E10 | 52.9 (5.74) | — | 3000+ |
| E11 | 5.5 (0.60) | — | 3000+ |
| E12 | 54.3 (5.90) | — | 3000+ |
| E13 | 53.1 (5.77) | — | 3000+ |
| E14 | 54.4 (5.91) | — | 3000+ |
| E15 | 60.5 (6.57) | — | 3000+ |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A crosslinkable composition comprising:
a) a first polymeric material of Formula (II)

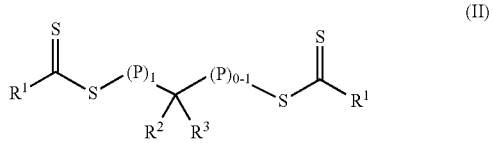

(II)

wherein
(P)$_1$ refers to one polymeric group and (P)$_{0-1}$ refers to 0 or 1 polymeric groups, wherein each polymeric group P is a polymeric group comprises a polymerized product of a first monomer composition comprising a first monomer having a single ethylenically unsaturated group;
each $R^1$ an alkoxy, alkaryloxy, alkenoxy, or $N(R^4)_2$;
$R^2$ is a group of formula $(OR^5)_q$—$OR^6$ or a group of formula —(CO)—X—$R^7$;
$R^3$ is hydrogen, alkyl, aryl, substituted aryl, alkaryl, a group of formula —(CO)—$OR^8$, or a group of formula —(CO)—$N(R^9)_2$;
each $R^4$ is an alkyl or two adjacent $R^4$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
$R^5$ is an alkylene;
$R^6$ is an alkyl;
$R^7$ is hydrogen, alkyl, aryl, substituted aryl, or aralkyl;
$R^8$ is an alkyl, aryl, aralkyl, or alkaryl;
$R^9$ is an alkyl, aryl, aralkyl, or alkaryl;
$R^{10}$ is hydrogen, alkyl, aryl, aralkyl, or alkaryl;
X is a single bond, oxy, or —$NR^{10}$—;
q is an integer equal to at least 0;
b) a crosslinking composition, wherein the crosslinking composition is miscible with the polymeric material of Formula (II) and comprises a chlorinated triazine crosslinking agent and/or a crosslinking monomer having at least two ethylenically unsaturated groups; and
c) a thixotropic agent comprising a metal oxide particle.

2. The crosslinkable composition of claim 1, wherein the weight average molecular weight of the polymeric material of Formula (II) is in a range of 5,000 Daltons to 500,000 Daltons.

3. The crosslinkable composition of claim 1, wherein the crosslinkable composition comprises 5 to 90 weight percent polymeric material of Formula (II) and a crosslinking composition comprising 1) 0.01 to 20 weight percent crosslinking monomer having at least two ethylenically unsaturated groups and 2) 0 to 95 weight percent monomer having a single ethylenically unsaturated group, each amount being based on a total weight of polymerized material and polymerizable material.

4. The crosslinkable composition of claim 1, wherein the crosslinkable composition comprises 5 to 40 weight percent polymeric material of Formula (II) and a crosslinking composition comprising 1) 0.01 to 10 weight percent crosslinking monomer having at least two ethylenically unsaturated groups and/or chlorinated triazine crosslinking agent and 2) 50 to 95 weight percent monomers having a single ethylenically unsaturated group.

5. The crosslinkable composition of claim 1, wherein the thixotropic agent comprises silica particles optionally treated with a surface modifying agent.

6. The crosslinkable composition of claim 5, wherein the surface modifying agent is a silane compound having at least one alkoxy group and at least one alkyl group.

7. The crosslinkable composition of claim 1, wherein the thixotropic agent is present in an amount in a range of 1 to 10 weight percent based on the total weight of polymerized material and polymerizable material.

8. The crosslinkable composition of claim 1, wherein the crosslinkable composition further comprises a Type I photoinitiator.

9. The crosslinkable composition of claim 1, wherein the crosslinkable composition has a Trouton's ratio in a range of 3 to 25 with an extensional rate of 1000 sec$^{-1}$.

10. The crosslinkable composition of claim 1, wherein the crosslinkable composition is printable or dispensable.

11. A crosslinked composition comprising a polymerized product of the crosslinkable composition of claim 1.

12. The crosslinked composition of claim 11, wherein the crosslinked composition is a pressure-sensitive adhesive.

13. An article comprising:
a) a substrate; and
b) the crosslinked composition of claim 11 adjacent to the substrate.

14. The article of claim 13, wherein the crosslinked composition is a pressure-sensitive adhesive.

15. The article of claim 13, wherein the crosslinked composition is in the form of a continuous layer or in the form of a pattern.

16. The article of claim 13, wherein the crosslinked composition is a pressure-sensitive adhesive, the substrate is a release liner, and the article is an adhesive transfer tape.

17. The article of claim 14, wherein the substrate is a release liner and wherein the pressure-sensitive adhesive layer has a first major surface adjacent to the release liner and a second major surface opposite the release liner, the first major surface having a peel strength within 30 percent of a peel strength of the second major surface.

* * * * *

UNITED STATES PATENT AND TRADEMARK OFFICE
CERTIFICATE OF CORRECTION

PATENT NO. : 10,913,807 B2
APPLICATION NO. : 15/733259
DATED : February 9, 2021
INVENTOR(S) : Serkan Yurt It is certified that error appears in the above-identified patent and that said Letters Patent is hereby corrected as shown below:

On the Title Page

Column 2
Item [56], Line 1, Delete "Miiiti-Fiinctionai" and insert -- Multi-functional --, therefor.

In the Specification

Column 10
Line 58, Delete "$R^X$" and insert -- $R^8$ --, therefor.

Column 11
Line 31, Delete "$R^1$—$M^+$" and insert -- $R^{1-}M^+$ --, therefor.

Column 12
Line 7, Delete "$R^1$—$M^+$" and insert -- $R^{1-}M^+$ --, therefor.

Column 14
Line 50, Delete "—$(OR^5)$—$OR^6$" and insert -- —$(OR^5)_p$—$OR^6$ --, therefor.

Column 15
Line 9, Delete "$R^1$" and insert -- $R^7$ --, therefor.

Column 45
Line 60, Delete "sec," and insert -- $sec^{-1}$, --, therefor.

Column 50
Line 33, Delete "(Si" and insert -- (S1 --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*

In the Claims

<u>Column 55</u>
Line 20, Claim 1, delete "$N(R^4)_2;$" and insert -- —$N(R^4)_2;$ --, therefor.
Line 21, Claim 1, delete "$(OR^5)_q$—$OR^6$" and insert -- —$(OR^5)_q$—$OR^6$ --, therefor.